(12) United States Patent
Kasama et al.

(10) Patent No.: US 7,508,044 B2
(45) Date of Patent: Mar. 24, 2009

(54) END FACE SENSOR AND METHOD OF PRODUCING THE SAME

(75) Inventors: Yasuhiko Kasama, Miyagi (JP); Kenji Omote, Miyagi (JP); Satoshi Fujimoto, Miyagi (JP)

(73) Assignee: Ideal Star Inc., Miyagi (JP)

( * ) Notice: Subject to any disclaimer, the term of this patent is extended or adjusted under 35 U.S.C. 154(b) by 83 days.

(21) Appl. No.: 10/538,937

(22) PCT Filed: Dec. 12, 2003

(86) PCT No.: PCT/JP03/15975

§ 371 (c)(1),
(2), (4) Date: Dec. 9, 2005

(87) PCT Pub. No.: WO2004/054004

PCT Pub. Date: Jun. 24, 2004

(65) Prior Publication Data

US 2006/0162474 A1 Jul. 27, 2006

(30) Foreign Application Priority Data

Dec. 12, 2002 (JP) ............................. 2002-361538

(51) Int. Cl.
*H01L 31/0232* (2006.01)
(52) U.S. Cl. ................ 257/431; 257/432; 257/433; 73/335.01; 73/705
(58) Field of Classification Search ............... 73/866.5, 73/431, 702, 703, 24.01, 29.01, 335.03, 705; 257/431, 432, 433, 434; 356/28, 35.5, 43, 356/44, 338, 400, 425, 625–635
See application file for complete search history.

(56) References Cited

U.S. PATENT DOCUMENTS

| | | | | | |
|---|---|---|---|---|---|
| 3,838,379 | A | * | 9/1974 | Gieles et al. | 338/42 |
| 4,119,513 | A | * | 10/1978 | Shum et al. | 204/428 |
| 4,249,418 | A | * | 2/1981 | Ebata | 374/117 |
| 4,343,688 | A | * | 8/1982 | Harwood | 204/430 |
| 4,587,840 | A | * | 5/1986 | Dobler et al. | 73/119 A |
| 6,094,988 | A | * | 8/2000 | Aindow | 73/649 |
| 6,224,094 | B1 | * | 5/2001 | Norton | 280/735 |
| 6,388,556 | B1 | * | 5/2002 | Imai et al. | 338/114 |
| 6,476,312 | B1 | | 11/2002 | Barnham | |
| 7,134,323 | B1 | * | 11/2006 | Discenzo | 73/53.05 |
| 2003/0079541 | A1 | * | 5/2003 | Mecham et al. | 73/335.01 |
| 2003/0121976 | A1 | * | 7/2003 | Ostergard | 235/454 |
| 2003/0143118 | A1 | * | 7/2003 | Draaijer | 422/82.06 |

FOREIGN PATENT DOCUMENTS

| | | |
|---|---|---|
| JP | 54-149488 | 11/1979 |
| JP | 63-232467 | 9/1988 |
| JP | 3-188303 | 8/1991 |
| JP | 9-243415 | 9/1997 |
| JP | 2000-292287 | 10/2000 |
| JP | 2000-340785 | 12/2000 |
| JP | 2001-77445 | 3/2001 |

* cited by examiner

*Primary Examiner*—David A. Rogers
(74) *Attorney, Agent, or Firm*—Young & Thompson

(57) ABSTRACT

An end face sensor device and a method of producing the sensor device, where the sensor device has flexibility or bendability independent of its shape and is suitable for constructing various devices with desired shapes. The end face sensor device is characterized in that a receptor portion is formed on an end face of a filiform body, the receptor body receiving information from a subject and outputting it as different information.

7 Claims, 27 Drawing Sheets

(a)

(b)

(a)      $v_0$: RAW MATERIAL EJECTION SPEED
         $v_1$: YARN-SHAPED BODY TRAVEL SPEED (b)

(c)

<<IN TUBE STATE>>
ENZYME FILM MAY BE USED IN GATE

PHOTOVOLTAIC ELEMENT (a)

EXTRUSION (b)

(a)

(b)

(c)

EXAMPLE OF PRODUCTION METHOD

① PREPARE SOURCE WIRING

② FORM SEMICONDUCTOR LAYER 1

COAT SILVER WIRE WITH SEMICONDUCTOR LAYER BY DIPPING METHOD

③ FORM GATE ELECTRODE

④ FORM SEMICONDUCTOR LAYER

⑤ FORM DRAIN ELECTRODE (a)

(b)

(c)

(d)

END FACE SENSOR AND METHOD OF PRODUCING THE SAME

TECHNICAL FIELD

The present invention relates to a linear element and a method of producing the linear element.

BACKGROUND ART

At present, various sensors become widespread and efforts are made to achieve higher integration and higher density. As one of the efforts, an art of performing integration in a three-dimensional manner is also attempted.

However, in any of the sensors, a rigid substrate such as a wafer is used as a basic component. As long as the rigid substrate is used as the basic component, its producing method is subjected to certain constraints and also there is a limit to the degree of integration. Further, a device shape is limited to a constant shape.

Also, conductive fiber in which a surface of cotton or silk is plated or wrapped with conductive material of gold or copper has been known.

However, an art of forming a circuit element inside one yarn has not been known. Also, in conductive fiber, the yarn itself such as cotton or silk is used as a basic component and the conductive fiber has the yarn itself in the center.

An object of the present invention is to provide an end face sensor device which has flexibility or bendability without being limited to its shape and can generate various apparatus with any shapes, and a method of producing the end face sensor device.

DISCLOSURE OF THE INVENTION

An end face sensor device of the present invention is characterized in that a receiving part for receiving information from a subject and outputting the information as another information is formed on an end face of a linear body.

Here, linear elements described below can be applied as the linear body. Also, dimensions and producing methods can apply correspondingly to those described for the linear elements.

It is characterized in that the receiving part is a light sensor.

It is characterized in that the light sensor is any of a photodiode, a phototransistor, a photo IC, a photo thyristor, a photoconductive element, a pyroelectric element, a color sensor, a solid-state image sensor, an element for position detection, and a solar battery.

It is characterized in that the receiving part is a temperature sensor.

It is characterized in that the receiving part is a humidity sensor.

It is characterized in that the receiving part is an ultrasonic sensor.

It is characterized in that the receiving part is a pressure sensor.

It is characterized in that a part or all of the receiving part is formed using a conductive polymer.

It is characterized in that only one molecule of the conductive polymer is present between electrodes.

It is characterized in that the linear body is a linear element in which a circuit element is formed continuously or intermittently in a longitudinal direction.

It is characterized in that the linear body is a linear element in which a cross section having plural regions for forming a circuit is formed-continuously or intermittently in a longitudinal direction.

A method of producing an end face sensor device of the present invention is characterized in that plural linear bodies are bundled to form a bundle and receiving parts are formed every said bundle.

A method of producing a multi-functional end face sensor device of the present invention is characterized in that plural bundles in which plural linear bodies are bundled are prepared and receiving parts with different functions every each of the bundles are formed and then the linear bodies are taken out of each of the bundles and said linear bodies taken out are bundled.

A method of producing an end face sensor device of the present invention is characterized in that one pair of electrodes are disposed in a linear body and a film is formed on an end face of the linear body while a bias voltage is applied between said electrodes.

It is characterized in that the bias voltage is an AC voltage.

It is characterized in that the film is made of a conductive polymer.

It is characterized in that a length of one molecule of the conductive polymer is shorter than or equal to a distance between the electrodes.

[Linear Element]

(Linear element 1) A linear element characterized in that a circuit element is formed continuously or intermittently in a longitudinal direction.

(Linear element 2) A linear element characterized in that a cross section having plural regions in which a circuit is formed is formed continuously or intermittently in a longitudinal direction.

(Linear element 3) A linear element as described in the linear element 1 or 2, characterized in that the element is an energy conversion element.

(Linear element 4) A linear element as described in the linear element 1 or 2, characterized in that the element is an electronic circuit element or an optical circuit element.

(Linear element 5) A linear element as described in the linear element 1 or 2, characterized in that the element is a semiconductor element.

(Linear element 6) A linear element as described in the linear element 1 or 2, characterized in that the element is a diode, a transistor or a thyristor.

(Linear element 7) A linear element as described in the linear element 1 or 2, characterized in that the element is a light emitting diode, a semiconductor laser or a light receiving device.

(Linear element 8) A linear element as described in the linear element 1 or 2, characterized in that the element is a DRAM, an SRAM, a flash memory or other memories.

(Linear element 9) A linear element as described in the linear element 1 or 2, characterized in that the element is a photovoltaic element.

(Linear element 10) A linear element as described in the linear element 1 or 2, characterized in that the element is an image sensor element or a secondary battery element.

(Linear element 11) A linear element as described in any one of the linear elements 1-10, characterized in that a longitudinal cross-sectional shape has a circle, a polygon, a star shape, a crescent shape, a pedal shape, a character shape or any other shapes.

(Linear element 12) A linear element as described in any one of the linear elements 1-11, characterized in that plural exposure parts are had in the linear side.

(Linear element 13) A linear element as described in any one of the linear elements 1-12, characterized in that all or a part of the linear element is an element formed by extrusion processing.

(Linear element 14) A linear element as described in the linear element 13, characterized in that a part or all of the linear element is an element formed by further drawing processing after extrusion processing.

(Linear element 15) A linear element as described in any one of the linear elements 12-14, characterized in that the linear element is an element processed by further expansion after extrusion processing.

(Linear element 16) A linear element as described in the linear element 15, characterized by being formed in a ring shape or a spiral shape after the expansion processing.

(Linear element 17) A linear element as described in the linear element 16, characterized in that the ring is a multiple ring.

(Linear element 18) A linear element as described in the linear element 17, characterized in that the multiple ring is made of different materials.

(Linear element 19) A linear element as described in any one of the linear elements 16-18, characterized in that a part of the ring or the spiral forms an exposure part.

(Linear element 20) A linear element as described in any one of the linear elements 16-19, characterized in that a part or the entire void of the ring or the spiral is filled with other materials.

(Linear element 21) A linear element as described in any one of the linear elements 1-20, characterized in that an outside diameter is 10 mm or smaller.

(Linear element 22) A linear element as described in any one of the linear elements 1-21, characterized in that an outside diameter is 1 mm or smaller.

(Linear element 23) A linear element as described in any one of the linear elements 1-20, characterized in that an outside diameter is 1 µm or smaller.

(Linear element 24) A linear element as described in any one of the linear elements 1-23, characterized in that an aspect ratio is 10 or more.

(Linear element 25) A linear element as described in any one of the linear elements 1-24, characterized in that an aspect ratio is 100 or more.

(Linear element 26) A linear element as described in any one of the linear elements 1-25, characterized in that a gate electrode region, an insulating region, source and drain regions, and a semiconductor region are formed inside a cross section.

(Linear element 27) A linear element as described in the linear element 26, characterized in that a gate electrode region is had in the center and on the outside of the gate electrode region, an insulating region, source and drain regions, and a semiconductor region are sequentially formed.

(Linear element 28) A linear element as described in the linear element 26, characterized in that a hollow region or an insulating region is had in the center and on the outward portion of the region, a semiconductor region is had and inside said semiconductor region, source and drain regions are had so as to outwardly expose some regions and on the outward portion of the regions, an insulating region and a gate electrode region are had.

(Linear element 29) A linear element as described in any one of the linear elements 1-26, characterized in that a region having at least a pn junction or a pin junction is formed inside a cross section.

(Linear element 30) A linear element as described in any one of the linear elements 1-29, characterized in that a semiconductor region in which the circuit is formed is made of an organic semiconductor material.

(Linear element 31) A linear element as described in the linear element 30, characterized in that the organic semiconductor material is polythiophene or polyphenylene.

(Linear element 32) A linear element as described in any one of the linear elements 1-31, characterized in that a conductive region in which the circuit is formed is made of a conductive polymer.

(Linear element 33) A linear element as described in the linear element 32, characterized in that the conductive polymer is polyacetylene, polyphenylene vinylene, or polypyrrole.

(Linear element 34) A linear element as described in any one of the linear elements 1-33, characterized in that a different circuit element is formed in any position of a longitudinal direction.

(Linear element 35) A linear element as described in any one of the linear elements 1-34, characterized in that a circuit element isolation region is had in any position of a longitudinal direction.

(Linear element 36) A linear element as described in any one of the linear elements 1-35, characterized in that a portion with a different cross-sectional outside diameter shape is had in any position of a longitudinal direction.

(Linear element 37) A linear element as described in any one of the linear elements 1-36, characterized in that a part of the region is constructed of a conductive polymer and the degree of longitudinal orientation of molecular chains is 50% or higher.

(Linear element 38) A linear element as described in any one of the linear elements 1-36, characterized in that a part of the region is constructed of a conductive polymer and the degree of longitudinal orientation of molecular chains is 70% or higher.

(Linear element 39) A linear element as described in any one of the linear elements 16-20, characterized in that a part of the region is constructed of a conductive polymer and the degree of circumferential orientation of molecular chains is 50% or higher.

(Linear element 40) A linear element as described in any one of the linear elements 16-20, characterized in that a part of the region is constructed of a conductive polymer and the degree of circumferential orientation of molecular chains is 70% or higher.

(Linear element 41) A method of producing a linear element, characterized in that a material for forming a region in which a circuit element is formed is dissolved, melted or gelled and said material is linearly extruded in a desired shape.

(Linear element 42) A method of producing a linear element as described in the linear element 41, characterized in that a part of the region is formed of a conductive polymer.

(Linear element 43) A method of producing a linear element as described in the linear element 41 or 42, characterized by further performing drawing processing after the extrusion.

(Linear element 44) A method of producing a linear element as described in linear elements 41 or 42, characterized by further performing expansion processing after the extrusion processing.

(Linear element 45) A method of producing a linear element as described in linear elements 43, characterized by further performing expansion processing after the drawing processing.

(Linear element 46) A method of producing a linear element as described in linear elements 44 or 45, characterized by being formed in a ring shape after the expansion processing.

(Linear element 47) A method of producing a linear element as described in any one of the linear elements 41-46, characterized in that the method is a method of producing a linear element laminated in multi layers outwardly from the center and a center layer is formed in a yarn shape to form a primary yarn-shaped body by extrusion and then while traveling said primary yarn-shaped body, materials of outward layers are ejected on surfaces to sequentially form the outward layers.

(Linear element 48) A method of forming a linear element as described in the linear element 47, characterized in that a difference between a travel speed and an ejection speed is set at 20 m/sec or higher at the time of extrusion of a conductive polymer.

(Linear element 49) A linear element of a small unit formed by slicing and separating a linear element as described in any one of the linear elements 1-40 perpendicularly with respect to a longitudinal direction.

(Linear element 50) A linear element as described in the linear element 1, characterized in that an electrode is had in the center and an insulating layer is formed on the outer circumference of said center electrode and a semiconductor layer in which plural pairs of source regions and drain regions are formed is formed on the outer circumference of said insulating layer.

(Linear element 51) A linear element as described in the linear element 1, characterized in that it is constructed so that an electrode is had in the center and an insulating layer is formed on the outer circumference of said center electrode and plural semiconductor layers and insulating layers are alternately formed on the outer circumference of said insulating layer and one or more pairs of a source region and a drain region are formed in each of the semiconductor layers and also a drain region or a drain electrode in the inside layer is located between the source region and the drain region.

(Linear element 52) A linear element as described in the linear element 1, characterized in that a source electrode is had in the center of a semiconductor layer and plural gate electrodes are had intermittently in a circumferential direction on the circumference of said source electrode through a semiconductor layer and a drain electrode is had on the outer circumference of said semiconductor layer.

As the linear elements described above, the following linear elements can be applied. A selection could be made properly according to use of a sensor. By using the linear element as a linear body, an output signal from a receiving part can be, for example, amplified. Also, the output signal from a receiving part can be calculated.

A linear element is a linear element characterized in that a circuit element is formed continuously or intermittently in a longitudinal direction.

Also, it is a linear element characterized in that a cross section having plural regions in which a circuit is formed is formed continuously or intermittently in a longitudinal direction.

It is a method of producing a linear element, characterized in that a material for forming a region in which a circuit element is formed is dissolved or melted and said material is linearly extruded in a desired shape.

That is, in this linear element, plural regions are had so as to form a circuit inside one cross section.

And, in the case of a linear element, the linear element also includes a linear element whose top has a needle shape and other shapes.

(Circuit Element)

Here, a circuit element includes, for example, an energy conversion element. The energy conversion element is an element for converting light energy into electrical energy or changing electrical energy into light energy. The element includes an electronic circuit element, a magnetic circuit element or an optical circuit element. The circuit element differs from an optical fiber for simply transmitting a signal and also differs from a conductor.

The circuit element includes, for example, an electronic circuit element or an optical circuit element. More specifically, it is, for example, a semiconductor element.

According to classification by the difference in a conventional process technique, a discrete (discrete semiconductor), a light semiconductor, a memory, etc. are given.

More specifically, the discrete includes a diode, a transistor (a bipolar transistor, an FET, an insulated gate type transistor), a thyristor, etc. The light semiconductor includes a light emitting diode, a semiconductor laser, a light emitting device (a photodiode, a phototransistor, an image sensor), etc. Also, the memory includes a DRAM, a flash memory, an SRAM, etc.

(Formation of Circuit Element)

In the present invention, a circuit element is formed continuously or intermittently in a longitudinal direction.

That is, it is placed so that plural regions are had inside a cross section perpendicular to the longitudinal direction and said plural regions form one circuit element, and such a cross section extends in a yarn shape continuously or intermittently in the longitudinal direction.

For example, for an NPN bipolar transistor, the bipolar transistor is constructed of three regions of an emitter N region, a base P region and a collector P region. Therefore, these three regions are placed inside a cross section in a state of providing necessary junction between the regions.

As its placement method, for example, a method of concentrically forming each of the regions and sequentially placing each of the regions from the center is contemplated. That is, the emitter region, the base region and the collector region could be formed sequentially from the center. Of course, another placement is also contemplated and the placement with the same topology could be used properly.

And, an electrode connected to each of the regions may be connected to each of the regions from an end face of a yarn-shaped element. Also, the electrode may be buried in each of the regions from the beginning. That is, in the case of concentrically placing each of the semiconductor regions, an emitter electrode could be formed in the center of the emitter region and a base electrode could be formed in the base region and a collector electrode could be formed in the outer circumference of the collector region continuously in a longitudinal direction in a manner similar to each of the semiconductor regions. And, the base electrode could be divided and placed.

The NPN bipolar transistor described above can be integrally formed by an extrusion formation method described below.

In the above description, the NPN transistor has been taken as an example, but similarly for other circuit elements, plural regions could be placed inside a cross section in a state of providing necessary junction to continuously form said cross section in a longitudinal direction by, for example, extrusion.

(Continuous Formation, Intermittent Formation)

A circuit element has the same shape in any cross section in the case of being formed continuously. This is in a state of being commonly called a cookie-cutter pattern.

In said circuit element, the same element may be formed continuously or intermittently in a longitudinal direction of a linear shape.

(Linear Shape)

An outside diameter in a linear element in the present invention is preferably 10 mm or smaller, and is more preferably 5 mm or smaller. The outside diameter is preferably 1 mm or smaller, and is more preferably 10 μm or smaller. Particularly, by performing drawing processing, the outside diameter can also be set at 1 μm or smaller and further 0.1 μm or smaller. In order to weave linear elements and form fabric, a smaller outside diameter is preferable.

In the case of attempting to eject a very thin linear body having an outside diameter of 1 μm or smaller from holes of a die and form the linear body, clogging of the holes may occur or breakage of a yarn-shaped body may occur. In such a case, linear bodies of each of the regions are first formed. Next, using the linear bodies as an island, many islands are formed and its circumference (sea) is surrounded by a soluble substance and it is bundled by a funnel-shaped mouthpiece and could be ejected as one linear body from a small opening. When an island component is increased and a sea component is decreased, a very thin linear body element can be produced.

As another method, a thick linear body element could be once formed and then be drawn in a longitudinal direction. Also, very thinning can be achieved by riding a melted raw material in a jet stream and performing a melt blow.

Also, an aspect ratio can be set at any value by extrusion formation. In the case by spinning, the aspect ratio is preferably 1000 or more as a yarn shape. For example, the aspect ratio can also be 100000 or more. In the case of using after cutting, the aspect ratio may be set at 10 to 10000, 10 or less and further 1 or less, 0.1 or less to form a linear element of a small unit.

(Intermittent Formation)

In the case of intermittently forming the same element, elements adjacent in a longitudinal direction can be formed into different elements. For example, a MOSFET (1), an element-to-element isolation layer (1), a MOSFET (2), an element-to-element isolation layer (2) . . . , a MOSFET (n), an element-to-element isolation layer (n) could be formed sequentially in the longitudinal direction.

In this case, a length of the MOSFET (k) (k=1 to n) may be equal to a length of another MOSFET or may be different from the length of another MOSFET. A selection can be made properly according to characteristics of a desired circuit element. Similar conditions apply to a length of the element-to-element isolation layer.

Of course, another layer may be interposed between the MOSFET and the element isolation layer.

In the above description, the MOSFET has been taken as an example, but in the case of forming another element, a layer necessary for use of another element could be inserted intermittently.

(Cross-Sectional Shape)

A cross-sectional shape of a linear element is not particularly limited. For example, the cross-sectional shape could be a circle, a polygon, a star shape and other shapes. For example, it may be a polygon shape in which plural vertical angles form acute angles.

Also, cross sections of each of the regions can be set arbitrarily. That is, for example, for a structure shown in FIG. 1, a gate electrode may have a star shape and the outside shape of a linear element may be a circle shape. When a surface of contact with an adjacent layer wants to be increased depending on an element, it is preferable to use a polygon shape in which a vertical angle forms an acute angle.

And, a cross-sectional shape can easily be implemented in a desired shape by setting a shape of an extrusion dice in said desired shape.

In the case of forming a cross section of the outermost layer in a star shape or a shape in which a vertical angle forms an acute angle, after extrusion formation, any other materials can be buried in space between the mutual vertical angles by, for example, dipping and characteristics of an element can be changed depending on uses of the element.

Also, by fitting a linear element with a concave cross-sectional shape into a linear element with a convex cross-sectional shape, connection between the linear elements can be made effectively.

And, when a semiconductor layer wants to be doped with impurities, the impurities may be contained in a melt raw material, but after extrusion formation, the semiconductor layer may be passed through a vacuum chamber in a linear state to be doped with the impurities inside the vacuum chamber by, for example, an ion implantation method. When the semiconductor layer is formed in the inside rather than the outermost layer, ions could be implanted in only the semiconductor layer which is an inside layer by controlling ion application energy.

(Production Example, Post Processing Formation)

The above production example is an example of integrally forming an element having plural layers by extrusion, but it may be formed by linearly forming a basic part of an element by extrusion and then coating said basic part by a proper method.

(Raw Material)

It is preferable to use a conductive polymer as materials of an electrode, a semiconductor layer, etc. For example, polyacetylene, polyacene, (oligoacene), polythiazyl, polythiophene, poly(3-alkylthiophene), oligothiophene, polypyrrole, polyaniline, polyphenylene, etc. are illustrated. The materials of the electrode or the semiconductor layer could be selected from these in consideration of conductivity etc.

And, as the materials of the semiconductor layer, for example, polyparaphenylene, polythiophene, poly(3-methylthiophene), etc. are preferably used.

Also, as source and drain materials, a material in which dopant is mixed into the above semiconductor material could be used. In order to form an n type, for example, alkali metals (Na, K, Ca) etc. could be mixed. $AsF_5/AsF_3$ or $ClO_4^-$ may be used as the dopant.

And, fullerene may be put into a conductive polymer material and may be used. In this case, it acts as an acceptor.

As insulating materials, general resin materials could be used. Also, $SiO_2$ and other inorganic materials may be used.

And, in the case of a linear element of a structure having a semiconductor region or a conductive region in the center, the center region may be constructed of amorphous materials (metal materials such as aluminum or copper; semiconductor materials such as silicon). The center region could be formed by inserting a linear amorphous material into the center of a die and traveling the linear amorphous material and coating the outer circumference of the linear amorphous material with another desired region by injection.

BEST MODE FOR CARRYING OUT THE INVENTION

Example 1

Figure 21:
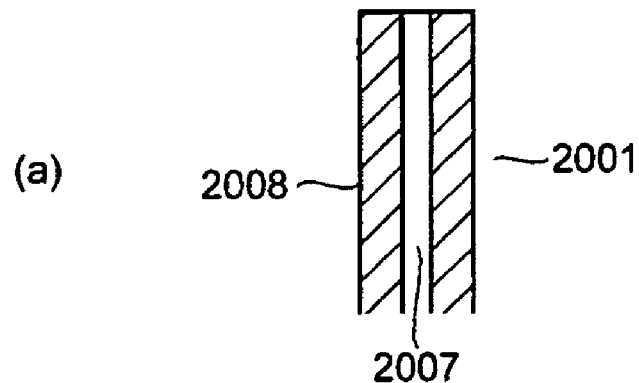
FIG. 21 is a process diagram showing an example 1.
Figure 21:
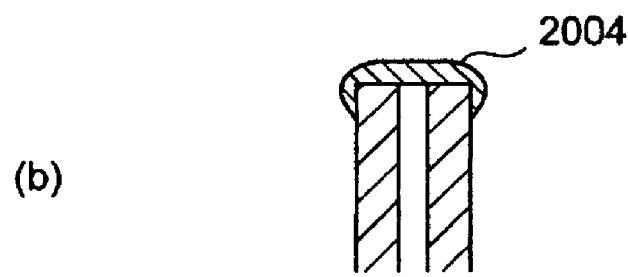
Figure 21:
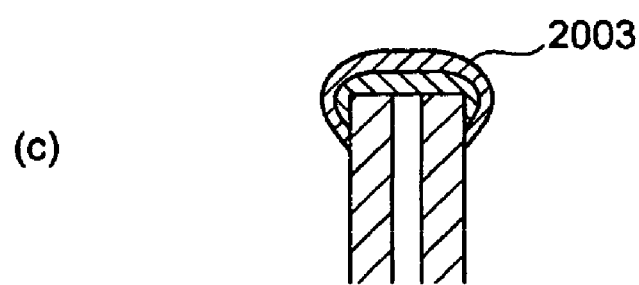
Figure 21:
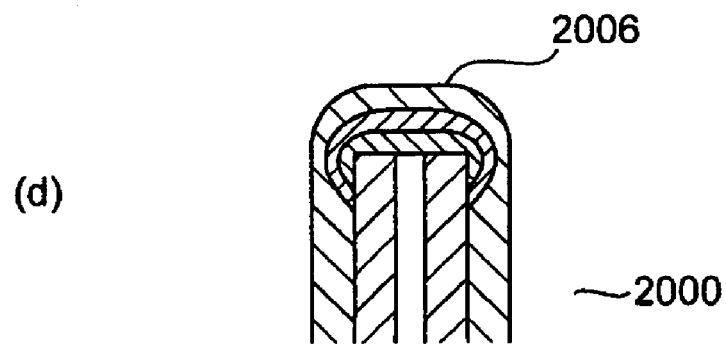

An end face sensor according to an example 1 of the present invention is shown in FIG. 21.

In an end face sensor device 2000 of the present example, a receiving part 2005 for receiving information from a subject and outputting the information as another information is formed on an end face of a linear body 2001.

Description will be made below in further detail.

The linear body 2001 has a center electrode 2007 in the center and the outer circumference of the center electrode is coated with an insulating film 2008.

The above-mentioned linear body 2001 is prepared and an n-type semiconductor layer 2004 is formed on an end face of the linear body. Next, a p-type semiconductor layer 2003 is formed on the n-type semiconductor layer 2004. As a result of this, a receiving part (light sensor) of pn junction is formed on the end face of the linear body 2001.

Then, by coating the p-type semiconductor layer 2003 and forming a transparent electrode 2006, the end face sensor device 2000 is completed.

Figure 22:
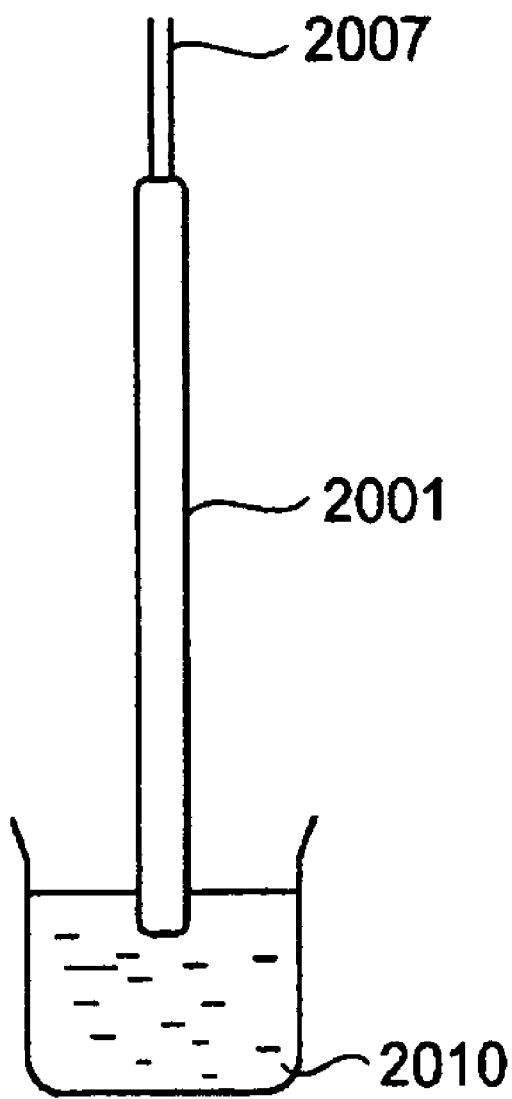
FIG. 22 is a diagram showing a production example in the example 1.

In a formation method of the n-type semiconductor layer 2004 and the p-type semiconductor layer 2003, a vapor phase formation method or a liquid phase formation method and other methods could be used and the formation method is not particularly limited to the formation methods. For example, it is preferable to use a method shown in FIG. 22. That is, the end face of the linear body 2001 of a conductive polymer could be immersed.

Also, in formation of the transparent electrode 2006, a vapor phase method, a liquid phase method and other methods could be used. The transparent electrode could be formed by immersion in melting liquid or solution of a conductive polymer in a manner similar to the formation of the semiconductor layer.

Example 2

The present example will describe a method of producing a multifunctional sensor device at high density without performing micromachining.

Figure 23:
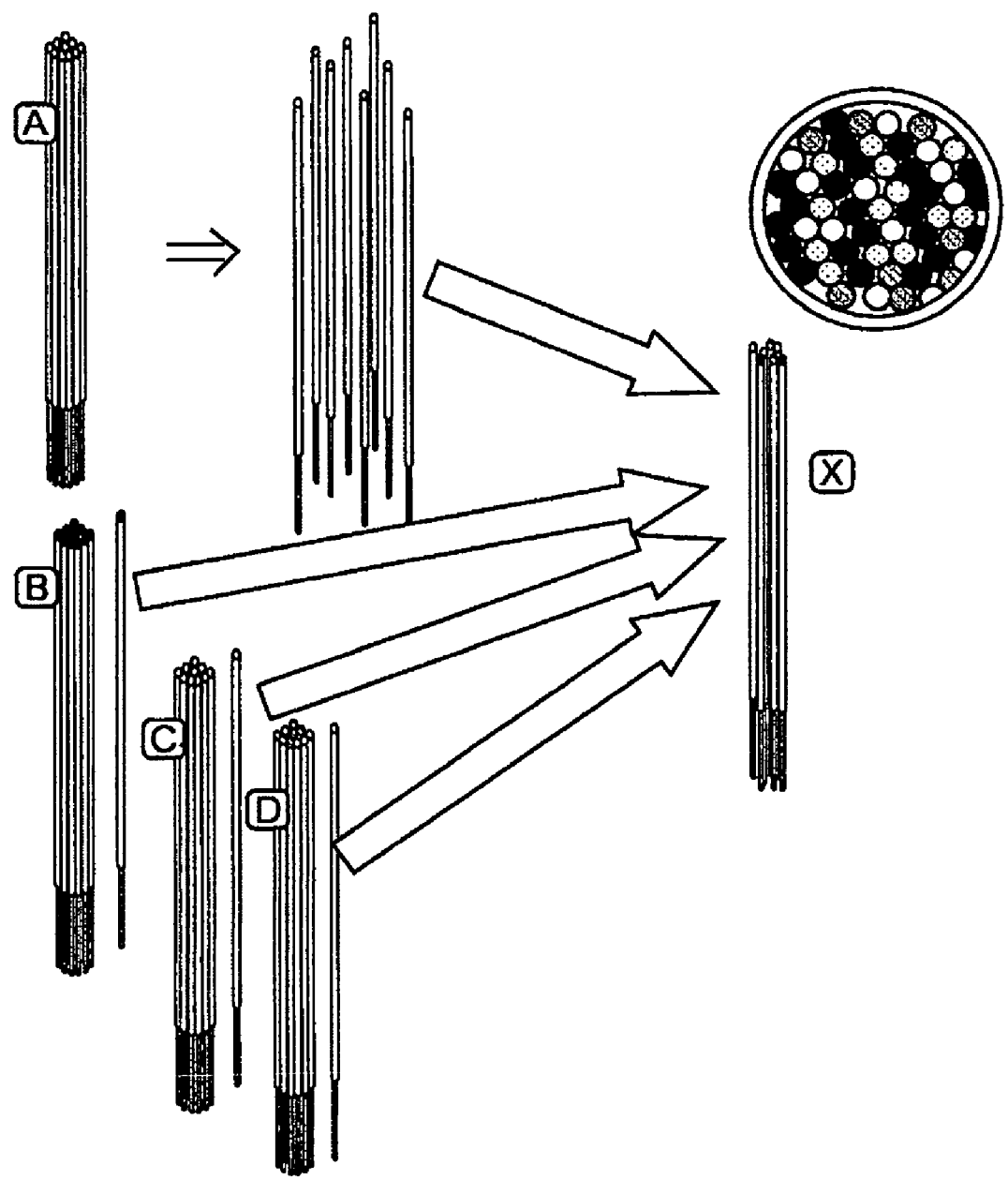
FIG. 23 is a perspective view showing a production example in an example 2.

As shown in FIG. 23, in the present example, plural linear bodies 2001 are prepared and the plural linear bodies are bundled. A receiving part is collectively formed on end faces of the linear bodies in a bundled state. For example, in the bundled state, the end faces are immersed in melting liquid or solution of a conductive polymer. As a result of this, end face sensor devices having uniform shapes and homogeneous characteristics on the end faces can be mass-produced.

Also, plural bundles are prepared and receiving parts having different functions every each bundle are formed. In FIG. 23, the receiving parts having each of the different functions are formed in bundles of A, B, C and D.

After the receiving parts are formed every bundle, one or plural end face sensor devices are taken out of each of the bundles and the end face sensor devices taken out are bundled to form a bundle X. And, the bundle X may be held inside a micro-syringe.

As a result of this, a multifunctional end face sensor device is formed.

By only gathering the end face sensor devices having necessary functions from each of the bundles and bundling the end face sensor devices in this manner, a high-density sensor array can be completed.

For example, in the case of bundling linear bodies with a diameter of 10 μm, about 330 to 400 linear end face sensor devices are inserted into a micro-syringe with an inside diameter of 0.2 μm. Various pieces of information can be received at high density (about 1200 thousands of pieces of information/cm2 in the present example). For example, in the case of a visual cell with a diameter of 3 μm, 1600 thousands of visual cells are buried in a region of 4 mm φ.

In addition, a multifunctional sensor device with high density can be produced without performing micromachining.

Example 3

Figure 24:
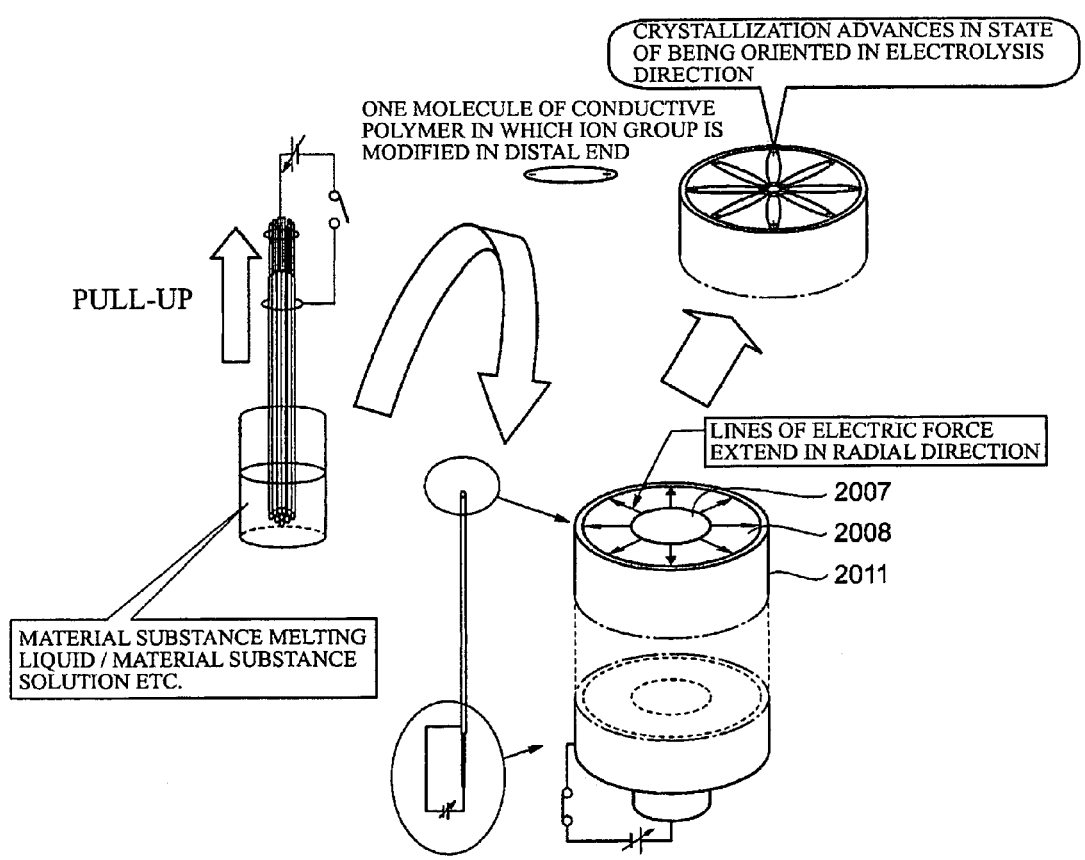
FIG. 24 is a perspective view showing a production example 3 in an example 3.

An example of formation on an end face while applying a bias is shown. Description will be made based on FIG. 24.

In the present example, a linear body in which an outer circumferential electrode 2011 is formed in the outer circumference of an insulating film 2008 is prepared as a linear body.

In the case of forming a receiving part on an end face, a bias voltage is applied between a center electrode 2007 and the outer circumferential electrode 2011. And, in the case of bundling linear bodies and forming a receiving part, outer circumferential electrodes of each of the linear bodies are brought into conduction.

The receiving part is formed of a conductive polymer and the distal end of one molecule of its conductive polymer is modified by an ion group. When a bias voltage is applied, lines of electric force extend in a radial direction and the conductive polymer is arranged in the radial direction and is formed. And, a molecular length of the conductive polymer could be made shorter than or equal to a distance between the center electrode 2007 and the outer circumferential electrode 2008. The molecular length of the polymer could be controlled by controlling the degree of polymerization.

In the present example, only one molecule is present between the electrodes. In the conductive polymer, a current flows between molecules by hopping of electrons. On the other hand, in the present example, a current flows without causing the hopping, so that a current speed becomes very high. Therefore, a high-speed operation is achieved in a semiconductor device including a semiconductor layer formed while applying the bias as described above.

And, the bias may be a DC, but it is preferable that the bias should be an AC. In the case of using the AC, entanglement of the mutual polymers is released and arrangement improves more. Particularly, it is preferable to change a frequency with time. And, it is preferable that a frequency of 1 Hz or higher should be used as the AC.

When an AC bias and a DC bias are superimposed and applied, the polymers in which the entanglement is released by the application of the AC bias are aligned between the electrodes by the application of the DC bias.

And, a technique for forming a film made of a conductive polymer while applying a bias voltage between electrodes or a technique for forming a conductive polymer film of a length of one molecule between electrodes can also be applied to the case of forming a film on a normal substrate face without being limited to the case of forming a film on an end face.

Also, the outer circumferential electrode may be an electrode circumferentially divided. Another electrode may be disposed between the center electrode and the outer circumferential electrode. Also, an electrode may be disposed in any position.

And, instead of applying a bias voltage between electrodes, sound waves may be applied to solution or dissolution liquid of a conductive polymer. That is, in a state of immersing an end face in solution or dissolution liquid of a conductive polymer, frequency by sound waves etc. is applied to said solution or dissolution liquid. The entanglement of the polymer is released by the application of the frequency. It is preferable that a frequency should be 1 Hz to 10 Mz. Of course, while applying the sound waves, a bias may be applied between electrodes.

Example 4

Figure 25:
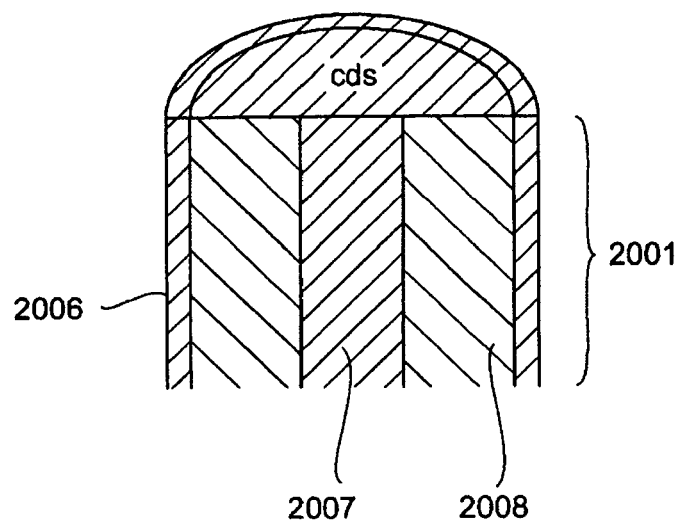
FIG. 25 is a sectional view showing an example 4.

FIG. 25 is a diagram showing an example of using CdS as a receiving part instead of a photodiode made of an n-type semiconductor layer and a p-type semiconductor layer.

That is, the example is means for utilizing a change in internal resistance with respect to incident light, and is an energy control type sensor.

The present end face sensor device can be applied to, for example, an illumination meter, an exposure meter of a camera.

Example 5

Figure 26:
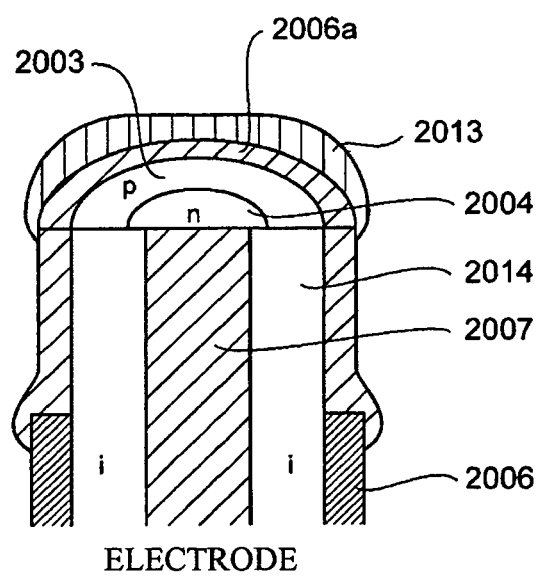
FIG. 26 is a sectional view showing an example 5.

The present example is an example of a color sensor device. The present example is shown in FIG. 26.

In the present example, a color filter 2013 of R, G, B, etc. is further formed on a transparent electrode 2006$a$ formed on the p-type semiconductor layer 2003 in the example 1. The color filter 2013 can easily be formed by immersing an end face of a linear body in dye solution.

And, in the linear body in the present example, an i layer is formed on the outer circumference of a center electrode 2007. A conductive polymer can also be used in the i layer. The i layer may naturally be formed by semiconductors other than the conductive polymer.

Example 6

Figure 27:
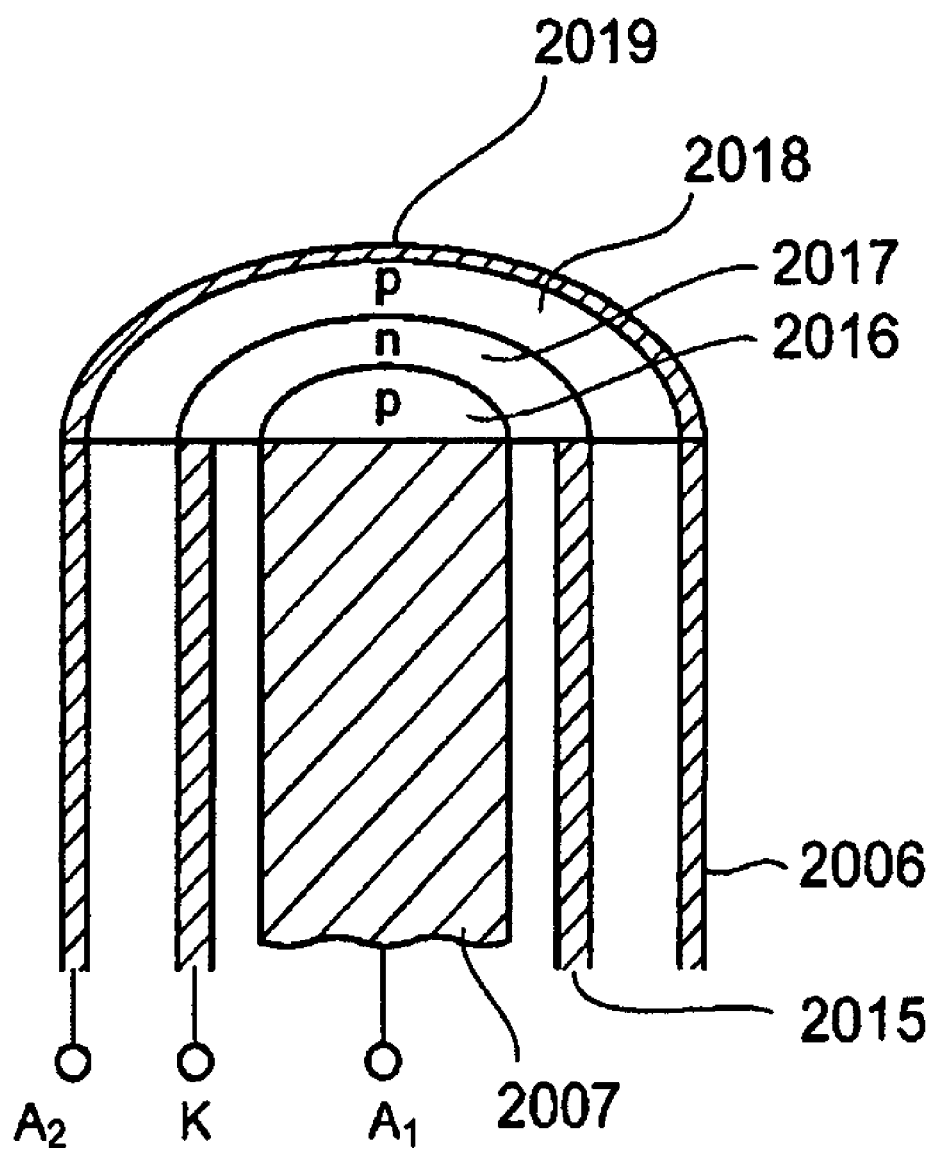
FIG. 27 is a sectional view showing an example 6.

The present example is a multilayer type sensor. The present example is shown in FIG. 27.

A linear body in the present example has a center electrode 2007, an intermediate electrode 2015 and an outer circumferential electrode 2006, and insulating films are interposed between the respective electrodes.

Also, a p-type semiconductor layer 2016, an n-type semiconductor layer 2017 and a p-type semiconductor layer 2018 are sequentially formed on an end face. A multilayer type color sensor is a sensor using the fact that the spectral sensitivity characteristics vary depending on the depth of a junction surface of a photodiode.

A color sensor device without using a filter can be implemented by a configuration of the present example. The uses include, for example, a use for identification of color, a use for white balance of a video camera, etc. Also, a signal processing circuit was conventionally complicated but by using a linear body, signal processing can also be performed easily by properly connecting electrode parts of the linear body.

Example 7

Figure 28:
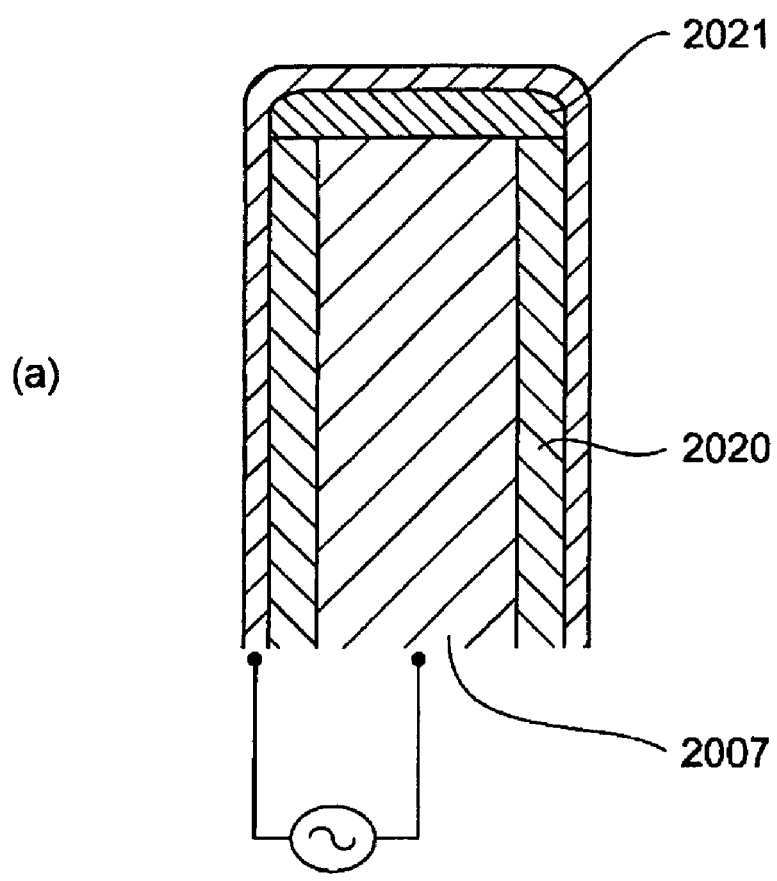
FIG. 28 is a sectional view showing an example 7.
Figure 28:
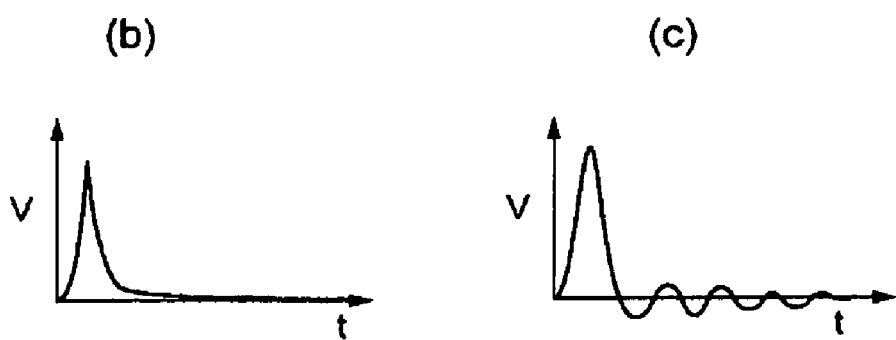

The present example is an ultrasonic sensor device. The present example is shown in FIG. 28.

A linear body is constructed of a center electrode 2007 and an i layer or an insulating film 2020 formed on the outer circumference of the center electrode 2007.

A piezoelectric film 2021 is formed on an end face of the linear body.

In the present example, it is preferable to construct the center electrode 2007 of a conductive polymer. Also, it is preferable to construct the i layer of a conductive polymer.

When the center electrode 2007 is constructed of metal, as shown in FIG. 28($c$), after the occurrence of sending waves, the small peaks occur and the small peaks become a cause of a reduction in a signal-to-noise ratio and result in an obstruction to achievement of high resolution. On the other hand, when the center electrode 2007 is constructed of the conductive polymer, as shown in FIG. 28($b$), the above small peaks do not occur and high resolution is achieved.

And, the present example can also be used as a medical ultrasonic sensor or an ultrasonic microscope.

Example 8

Figure 29:
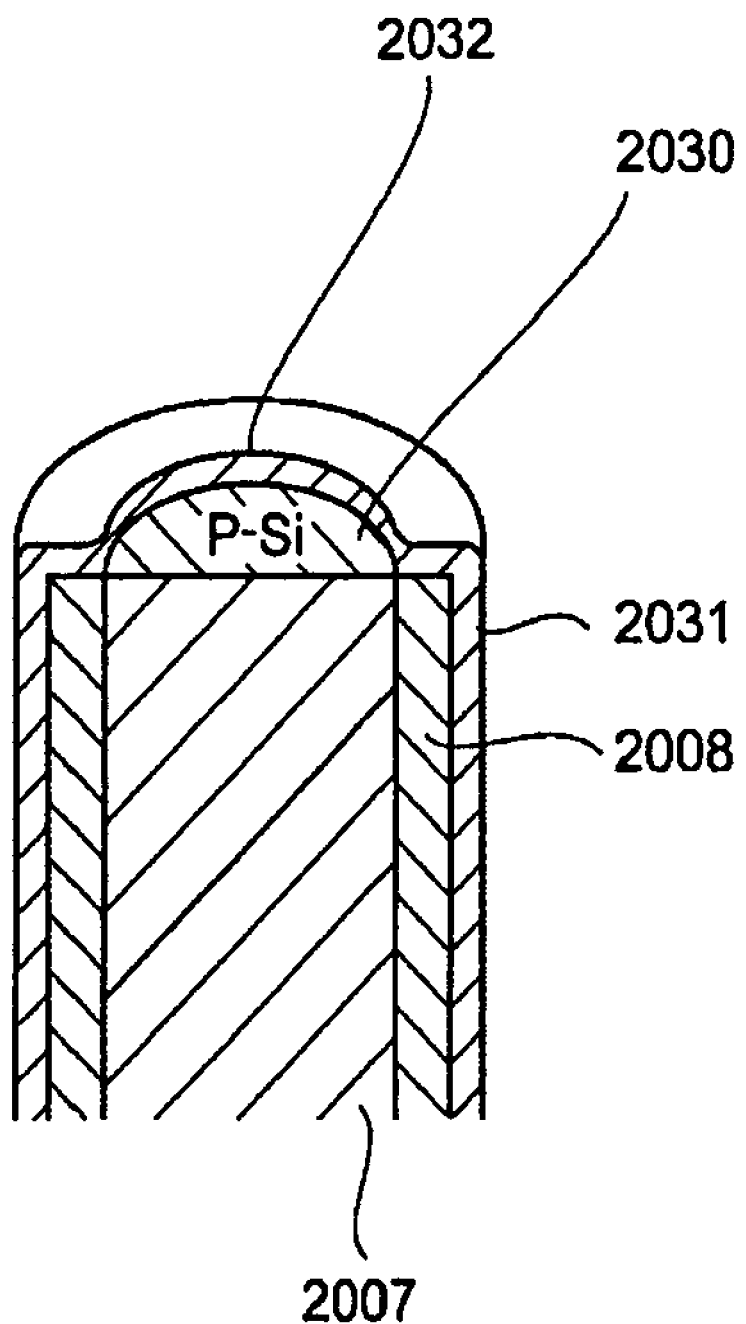
FIG. 29 is a sectional view showing an example 8.

The present example is an example of an ion sensor or a biosensor. The present example is shown in FIG. 29.

A linear body is constructed of a center electrode 2007 and an insulating film 2008 formed on the outer circumference of the center electrode.

A p-Si 2030 is formed on an electrode part of an end face of the linear body and thereafter, the whole is coated with an $SiO_2$ film 2031.

An ion sensitive film 2032 is formed on an end face part of the $SiO_2$ film 2031.

The example is an example of forming an ion sensitive film on the end face as the ion sensitive film 2032.

Example 9

In addition to the above, various receiving parts according to subjects can be formed on end faces. For example, the receiving parts include a taste sensor, a smell sensor, an enzyme sensor, a molecular recognition sensor in which cyclodextrin is formed on an end face. Various sensor devices can be formed when a receiving part is formed by properly selecting a receiving film capable of exhibiting variations in an output signal at the time of receiving a subject.

Any of an energy conversion type sensor and an energy control type sensor may be used as a sensor.

Linear Element Example

Test Example 1

Figure 1:
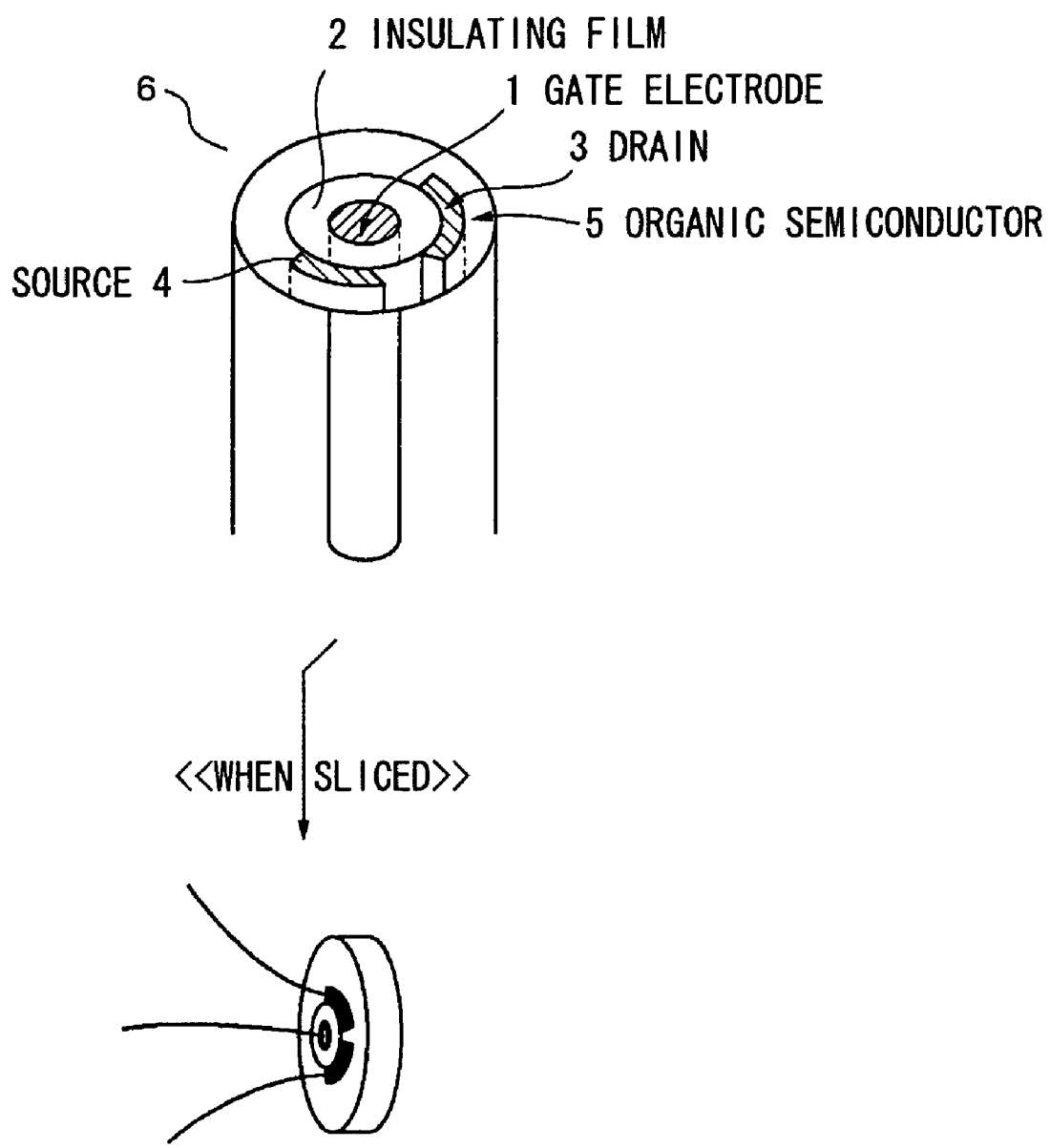
FIG. 1 is a perspective view showing a linear element according to a linear element example.

A linear element example is shown in FIG. 1.

Numeral 6 is a linear element and in this example, a MOSFET is shown.

In the cross section, this element has a gate electrode region 1 in the center and in the outside of the gate electrode region, an insulating region 2, a source region 4, a drain region 3 and a semiconductor region 5 are sequentially formed.

Figure 2:
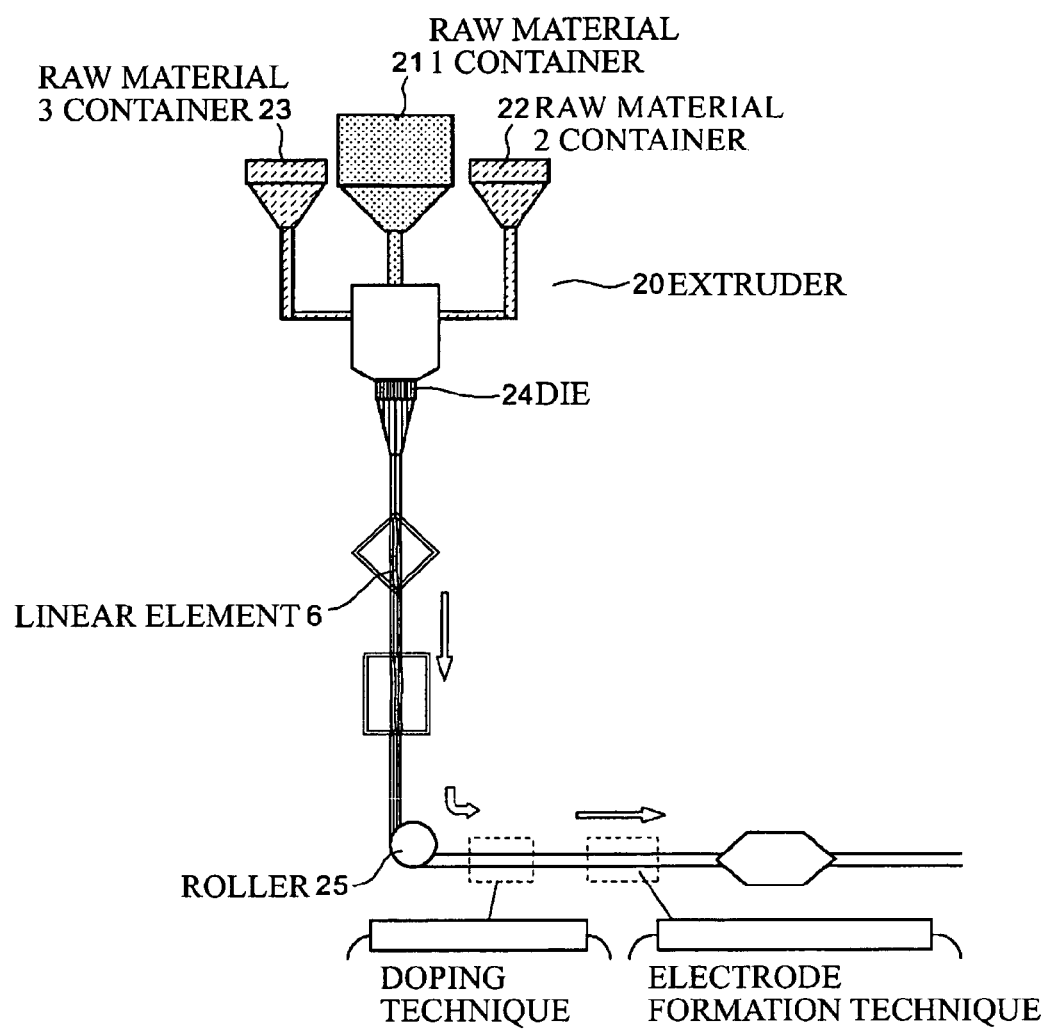
FIG. 2 is a concept front diagram showing an example of a production apparatus of the linear element.

On the other hand, a general configuration of an extruder for forming such a linear element is shown in FIG. 2.

An extruder 20 has raw material containers 21, 22, 23 for holding raw materials for constructing plural regions in a melt state or a dissolution state or a gel state. In an example shown in FIG. 2, three raw material containers are shown, but the raw material containers could be disposed properly according to a configuration of the linear element produced.

A raw material inside the raw material container 23 is fed to a die 24. Ejection holes according to a cross section of the linear element to be produced are formed in the die 24. A linear body ejected from the ejection holes is wound on a roller 25 or is fed to the next process in a linear state as necessary.

Figure 3:
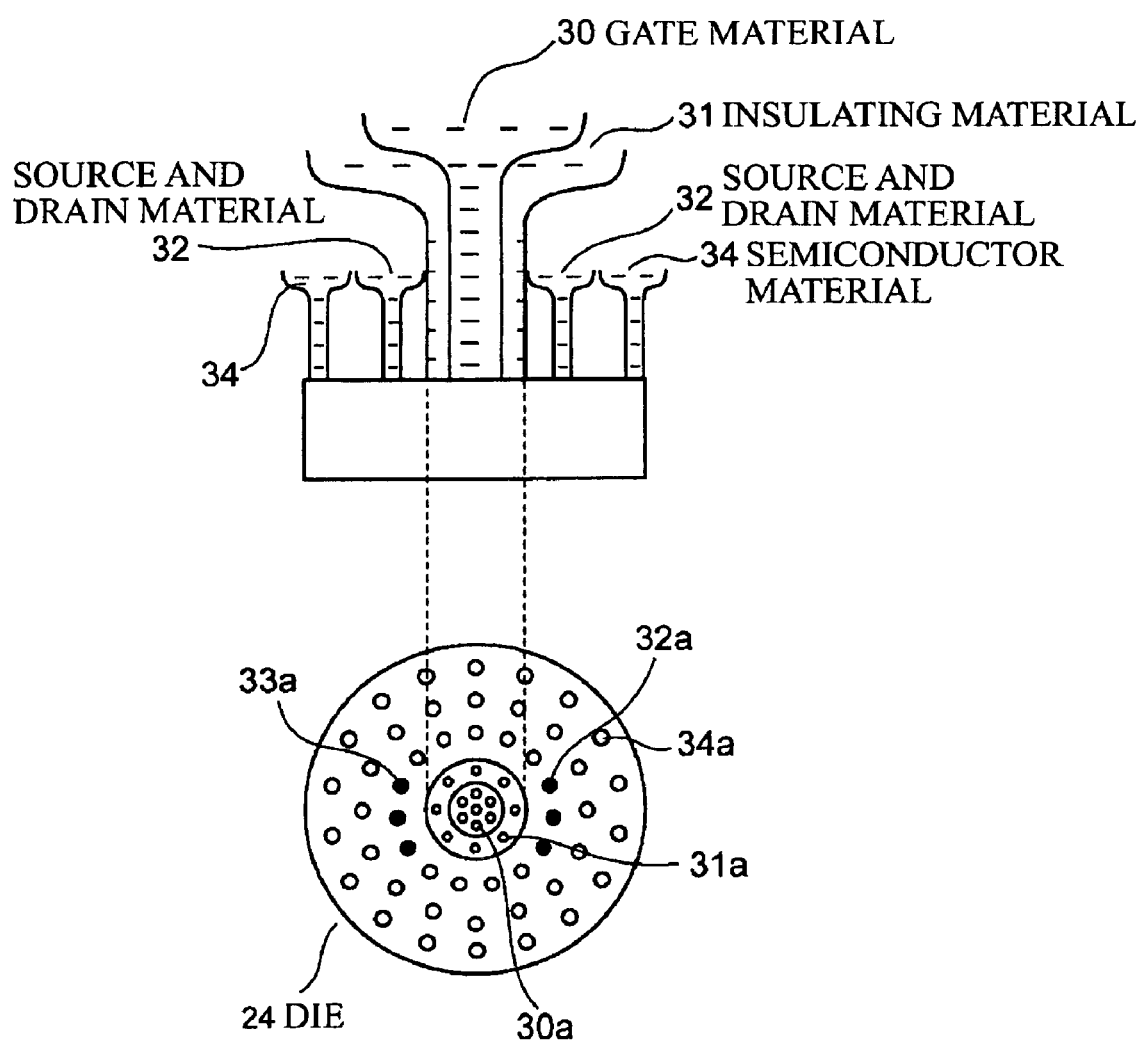
FIG. 3 is a front view showing an extruder used in production of the linear element and a plan view of a die.

A configuration as shown in FIG. 3 is adopted in the case of producing the linear element of the structure shown in FIG. 1.

As the raw material containers, a gate material 30, an insulating material 31, a source and drain material 32, and a semiconductor material 34 are respectively held inside the containers in a melt or dissolution state or a gel state. On the other hand, in the die 24, holes are formed in communication with the respective material containers.

That is, plural holes 30a for ejecting the gate material 30 are first formed in the center. Plural holes 31a for ejecting the insulating material 31 are formed in the outer circumference of the center. Then, in the outer circumference, plural holes are further formed and only some holes 32a, 33a of the plural holes are in communication with the source and drain material container 32. The other holes 34a are in communication with the semiconductor material container 34.

When the raw material in a melt state, a dissolution state or a gel state is fed from each of the raw material containers to the die 24 and is ejected from the die 24, the raw material is ejected from each of the holes and hardens. By pulling the end of the raw material, a linear element is formed in a yarn-shaped continuous state.

The yarn-shaped linear element is wound on the roller 25 or is fed to the next process in a yarn-shaped state as necessary.

As the gate electrode material, a conductive polymer could be used. For example, polyacetylene, polyphenylene vinylene, polypyrrole, etc. are used. Particularly, by using polyacetylene, a linear element with a smaller outside diameter can be formed, so that it is preferable.

As the semiconductor material, for example, polyparaphenylene, polythiophene, poly(3-methylthiophene), etc. are preferably used.

Also, as the source and drain material, a material in which dopant is mixed into the semiconductor material could be used. In order to form an n type, for example, alkali metals (Na, K, Ca) etc. could be mixed. $AsF_5/AsF_3$ or $ClO_4^-$ may be used as the dopant.

As the insulating material, general resin materials could be used. Also, $SiO_2$ and other inorganic materials may be used.

The materials illustrated above are similarly used in linear elements shown in the following linear element examples.

And, in the present example, a takeout electrode is connected to an end face of the linear body. A takeout opening may naturally be disposed in the side of a proper position of a longitudinal direction.

Linear Element Example 2

Figure 4:
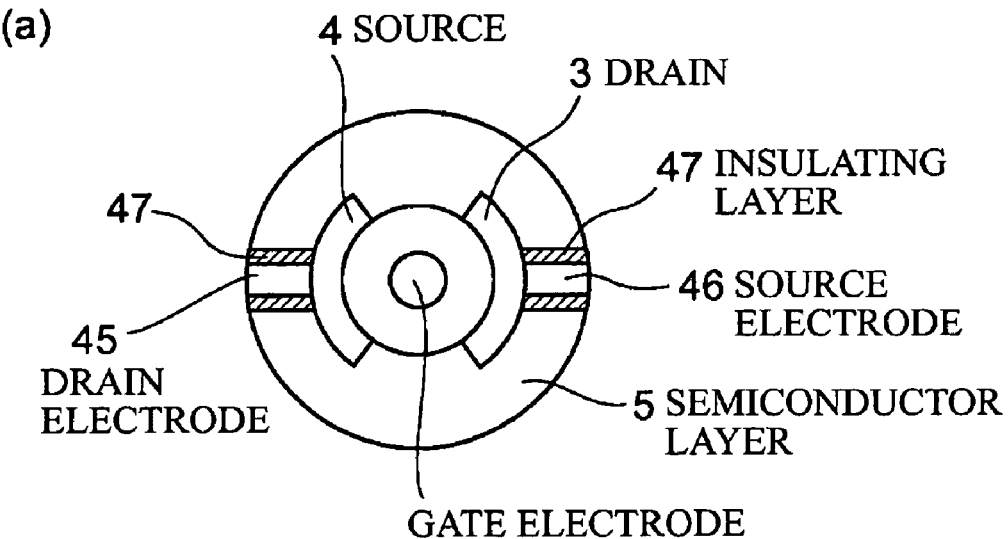
FIG. 4 is a view showing a linear element example of a linear element.
Figure 4:
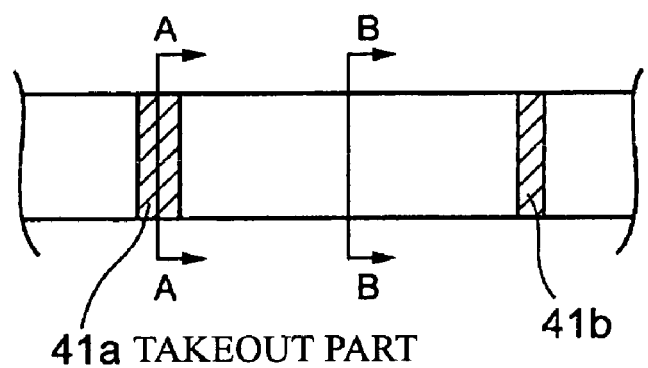

A linear element example 2 is shown in FIG. 4.

In the present example, the takeout electrode in the linear element example 1 is disposed in the side of a linear element. Takeout parts 41a, 41b shown in FIG. 4(b) can be set in a desired position of a longitudinal direction. A spacing between the takeout part 41a and the takeout part 41b can also be set at a desired value.

A cross section A-A of the takeout part 41 is shown in FIG. 4(a). And, a cross section B-B of FIG. 4(b) is a structure of the end face shown in FIG. 1.

In the present example, a source electrode 45 and a drain electrode 46 acting as takeout electrodes in the sides of a source 4 and a drain 3 are respectively connected to the source 4 and the drain 4. Also, a semiconductor layer 5 is insulated from the source electrode 45 and the drain electrode 46 by an insulating layer 47.

Figure 5:
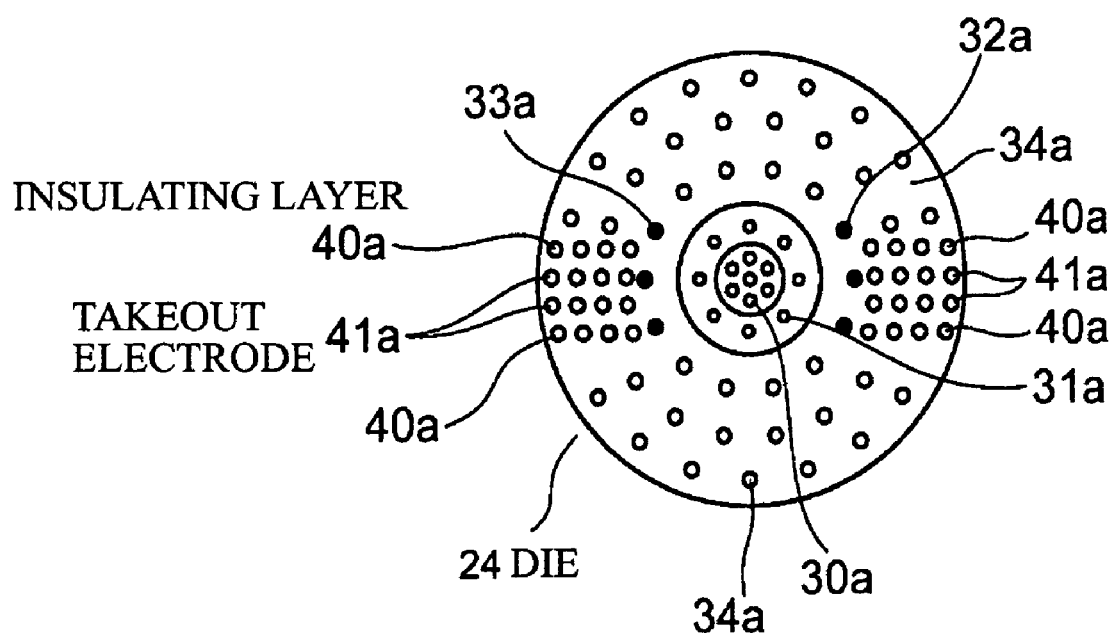
FIG. 5 is a plan view of a die used in production of the linear element.

In order to form such a configuration, a die shown in FIG. 5 is used. That is, holes 40a for insulating layer and holes 41a for takeout electrode are disposed in the sides of source and drain material ejection openings 33a, 34a. The holes 40a for insulating layer are in communication with an insulating layer material container (not shown) and the holes 41a for takeout electrode are in communication with a takeout electrode material container (not shown).

In this case, raw materials are first ejected from only the numerals 30a, 31a, 32a, 33a, 34a. That is, ejection from the holes 40a, 41a is turned off. A semiconductor layer raw material moves around portions corresponding to the holes 40a, 41a and is extruded in the cross section shown in the linear element example 1. And, in this case, the widths of the insulating layer 47, the drain electrode 46 and the source electrode 45 are set small. When ejection from the holes 40a, 41a is turned off, the material forming the semiconductor layer moves around the portions.

Next, ejection from the holes 40a, 41a is turned on. As a result of this, a shape of the cross section changes and the material is extruded in the cross section shown in FIG. 5. By properly changing the time at which the holes 40a, 41a are turned on and the time at which the holes 40a, 41a are turned off, a length of the cross section A-A and a length of the cross section B-B can be adjusted to an arbitrary length.

And, it is also an example of intermittently forming shapes of the cross section of the present example, and as A-A, other shapes of the cross section and materials can also be used. For example, all the A-A can also be formed in an insulating layer. Also, in the case of other end face shapes, the shapes can be formed by a similar technique.

And, when areas of the drain electrode 46 and the source electrode 45 are set large and ejection from the holes 41a for takeout electrode is turned off, the raw material of the semiconductor layer or the raw material of the insulating layer does not completely move around and portions corresponding to the source electrode and the drain electrode become space. An electrode material could be buried in its space after extrusion.

Linear Element Example 3

Figure 6:
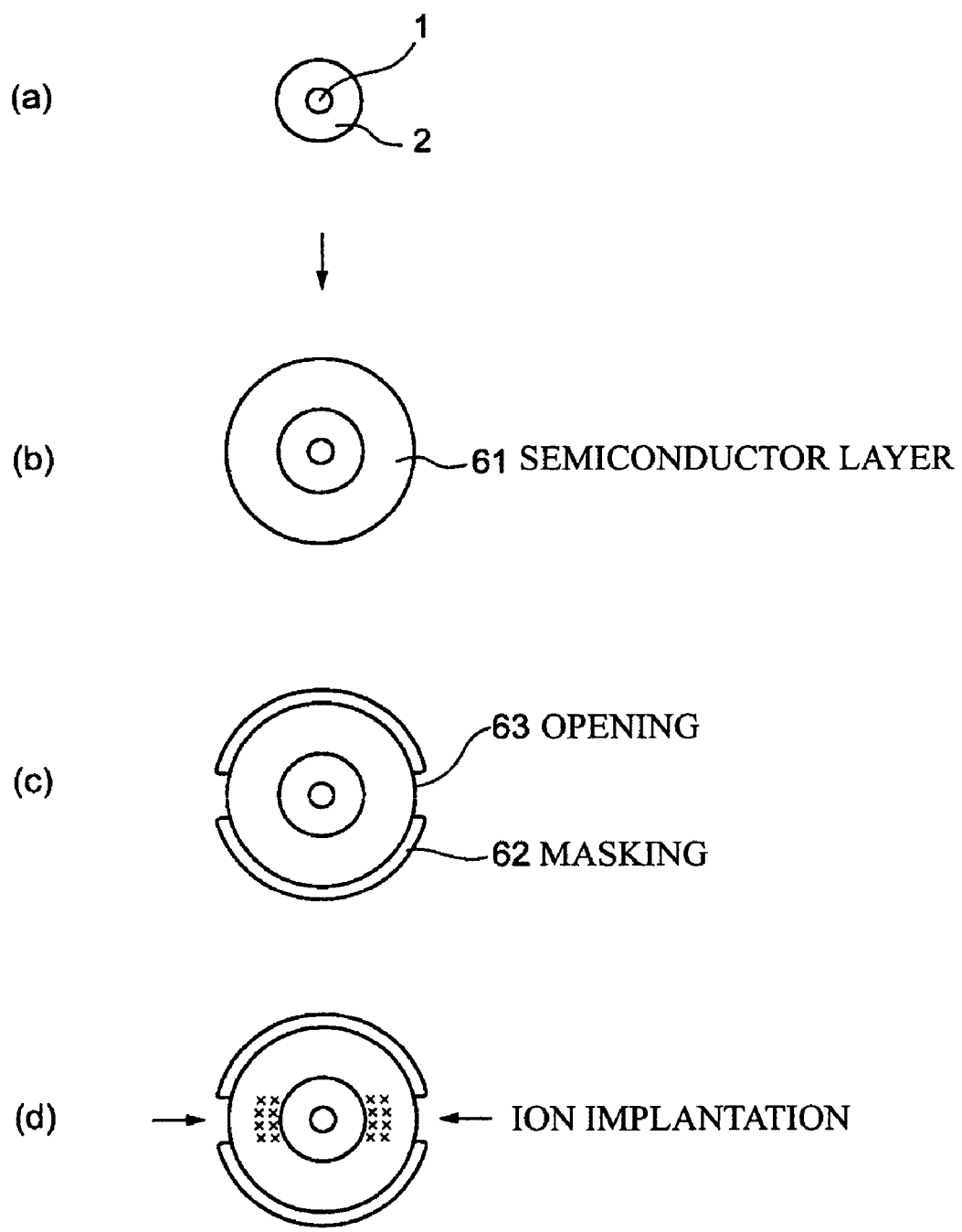
FIG. 6 is a sectional view showing a production process example of a linear element.

A linear element example is shown in FIG. 6.

The case of integrally forming the linear element by extrusion has been shown in the linear element examples 1 and 2, but in the present example, an example of forming a portion of a linear element by extrusion and forming the other portion by external processing is shown.

As a linear element, the linear element shown in the linear element example 2 is taken as an example.

First, a gate electrode 1 and an insulating film 2 are formed into a yarn-shaped intermediate body by extrusion (FIG. 6(*a*)).

Next, the outside of the insulating film 2 is coated with a semiconductor material made in a melt or dissolution state or a gel state and a semiconductor layer 61 is formed into a secondary intermediate body (FIG. 6(*b*)). In such coating, the yarn-shaped intermediate body could be passed into a bath of the semiconductor material in the melt or dissolution state or the gel state. Or, a method such as vapor deposition may be adopted.

Then, the outside of the semiconductor layer 61 is coated with a masking material 62. The coating of the masking material 61 could also be formed by, for example, passing the secondary intermediate body into the masking material made in a melt or dissolution or gel state.

Then, predetermined positions (positions corresponding to drain and source) of the masking material 62 are removed by etching etc. and openings 63 are formed (FIG. 6(*c*)).

Then, while the yarn-shaped secondary intermediate body is passed into a pressure reducing chamber, a range is controlled and ion implantation is performed (FIG. 6(*d*)).

Then, a source region and a drain region are formed by passing through a heat treatment chamber and performing annealing.

Thus, the extrusion and the external processing could be combined properly according to materials or arrangement of the regions formed.

Linear Element Example 4

An example of sequentially forming each of the regions in the linear element shown in FIG. 1 is shown in the present example.

Figure 7:
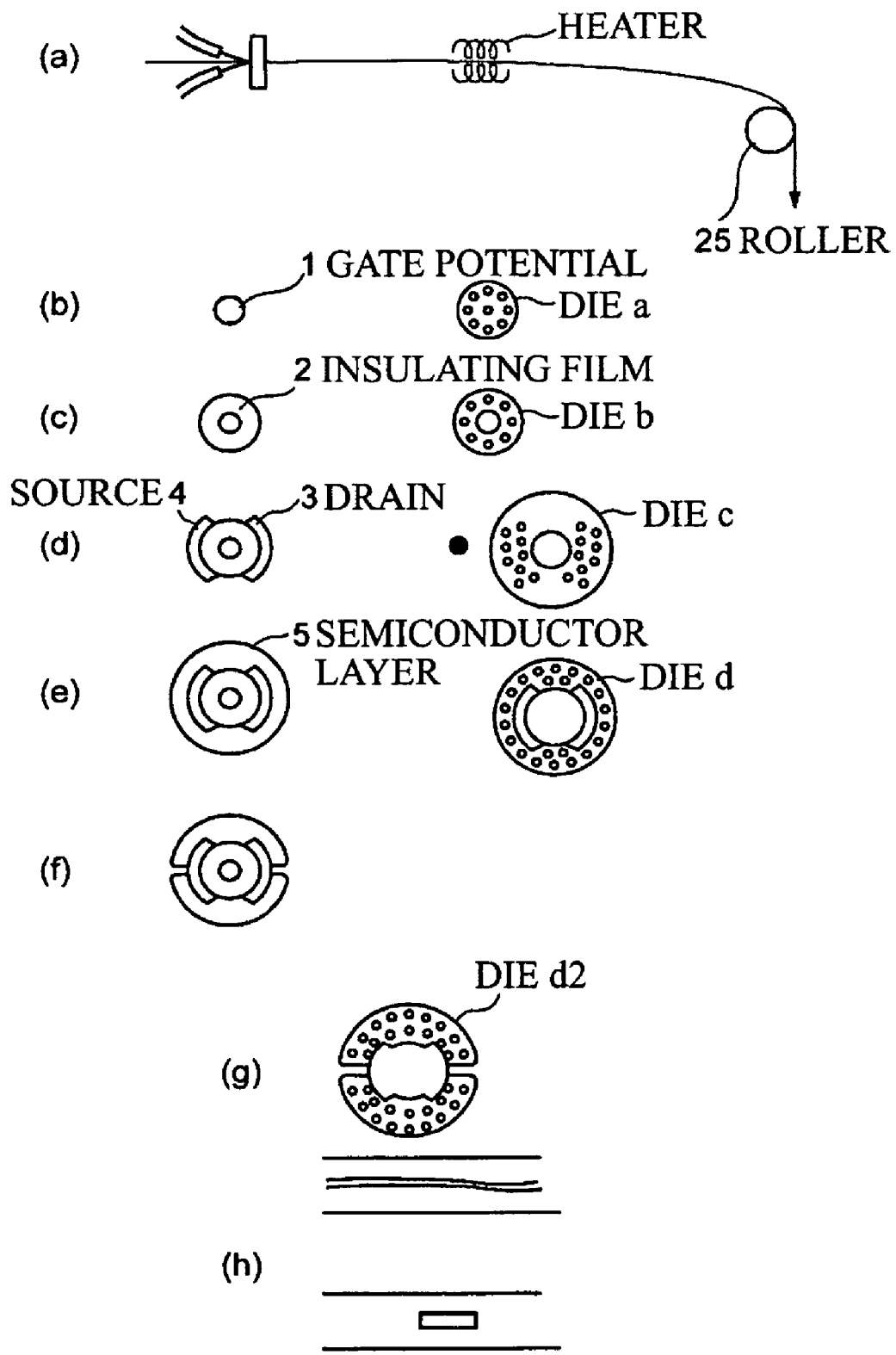
FIG. 7 is a diagram showing a production process example of a linear element.

The procedure is shown in FIG. 7.

First, by a spinning technique, a gate electrode raw material is ejected from holes of a die a and a gate electrode 1 is formed (FIG. 7(*b*)). For the sake of convenience, this gate electrode 1 is called an intermediate yarn-shaped body.

Next, as shown in FIG. 7(*a*), while the intermediate yarn-shaped body is inserted into the center of a die b and the intermediate yarn-shaped body is traveled, an insulating film material is ejected from holes formed in the die b and an insulating film 2 is formed (FIG. 7(*c*)). And, a heater is disposed in the downstream side of the die b. The yarn-shaped body is heated by this heater as necessary. By the heating, a solvent component in the insulating film can be removed from the insulating film. The following formation of and a semiconductor layer is similar.

Then, source and drain layers 3 and 4 are formed while the intermediate yarn-shaped body is traveled (FIGS. 7(*c*) and 7(*d*)). And, the source region 4 and the drain region 3 are isolated and formed on the insulating film 2. This can be achieved by disposing holes in only a portion of a die c.

Then, a semiconductor layer 5 is formed similarly while the intermediate yarn-shaped body is inserted into the center in the die and is traveled similarly.

And, as shown in FIG. 7(*f*), when takeout electrodes for source and drain want to be disposed in a portion of a longitudinal direction, supply of raw material from some holes (holes of portions corresponding to source and drain electrodes) of plural holes disposed in a die d could be turned off. Also, when holes for takeout want to be disposed in all of the longitudinal direction, the semiconductor layer could be formed using a die d2 as shown in FIG. 7(*g*).

Linear Element Example 6

Figure 8:
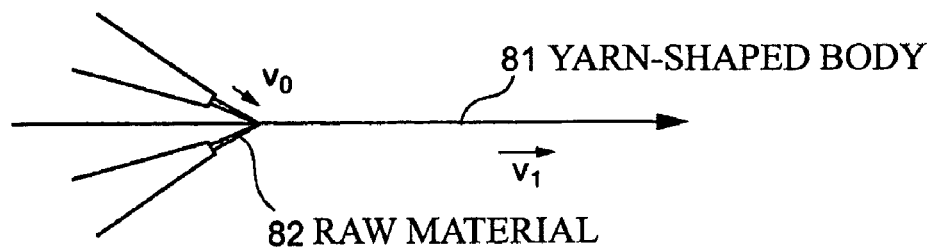
FIG. 8 is a diagram showing a production example of a linear element.
Figure 8:
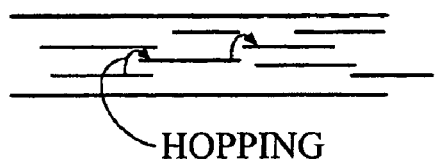
Figure 8:
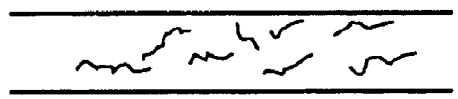

A linear element example 6 is shown in FIG. 8.

The present example shows an example of ejection of a conductive polymer of the case of using the conductive polymer as a formation material of a semiconductor device.

In the linear element example 5, the example of forming an outer layer on a surface of an intermediate yarn-shaped body while the intermediate yarn-shaped body is inserted into a die has been shown. The present example shows the case that this outer layer is a conductive polymer.

A speed difference ($v_1 - v_0$) of a raw material 82 is set at 1 m/sec or higher. The difference is preferably set at 20 m/sec or higher. The difference is more preferably 50 m/sec or higher. The difference is further preferably 100 m/sec or higher. An upper limit is the speed at which an intermediate yarn-shaped body is not cut. The speed at which cutting is caused varies depending on the discharge amount of material, the viscosity of material, the ejection temperature, etc. and specifically, conditions of material etc. of practice could be set and obtained previously by experiment.

By setting a difference between an ejection speed $v_0$ and a travel speed $v_1$ at 1 m/sec or higher, acceleration is applied to the ejected material and external force is exerted. A main direction of the external force is a travel direction. Molecular chains in the conductive polymer are generally in a twist state as shown in FIG. 8(*c*) and also, the longitudinal directions of the molecular chains are directed in random directions. Whereas the external force is applied in the travel direction together with ejection, the molecular chains are horizontally aligned in the longitudinal directions while the twist is released as shown in FIG. 8(*b*).

By the way, electrons (or holes) move to the molecular chain with the closest level by hopping as shown in FIG. 8(*b*). Therefore, when the molecular chains are horizontally oriented as shown in FIG. 8(*b*), hopping of electrons becomes easy to occur extremely as compared with the case of being randomly oriented as shown in FIG. 8(*c*).

By applying the external force to the travel direction together with ejection, the molecular chains can be oriented as shown in FIG. 8(b). Also, a distance between the mutual molecular chains can be shortened.

And, the present example can naturally be applied to other linear element examples in the case of forming a predetermined region by the conductive polymer.

By setting the degree of longitudinal orientation of the molecular chains at 50% or higher, electron mobility improves and a linear element with better characteristics can be formed. A high degree of orientation can also be controlled by controlling the difference between the ejection speed and the travel speed. Also, it can also be controlled by controlling a draw ratio in a longitudinal direction.

And, the degree of orientation described herein is a value in which a ratio of the number of molecules having an inclination of 0 to ±5° with respect to the longitudinal direction to the total number of molecules is multiplied by 100.

And, a linear element with still better characteristics can be obtained by being set at 70% or higher.

Linear Element Example 7

Figure 9:
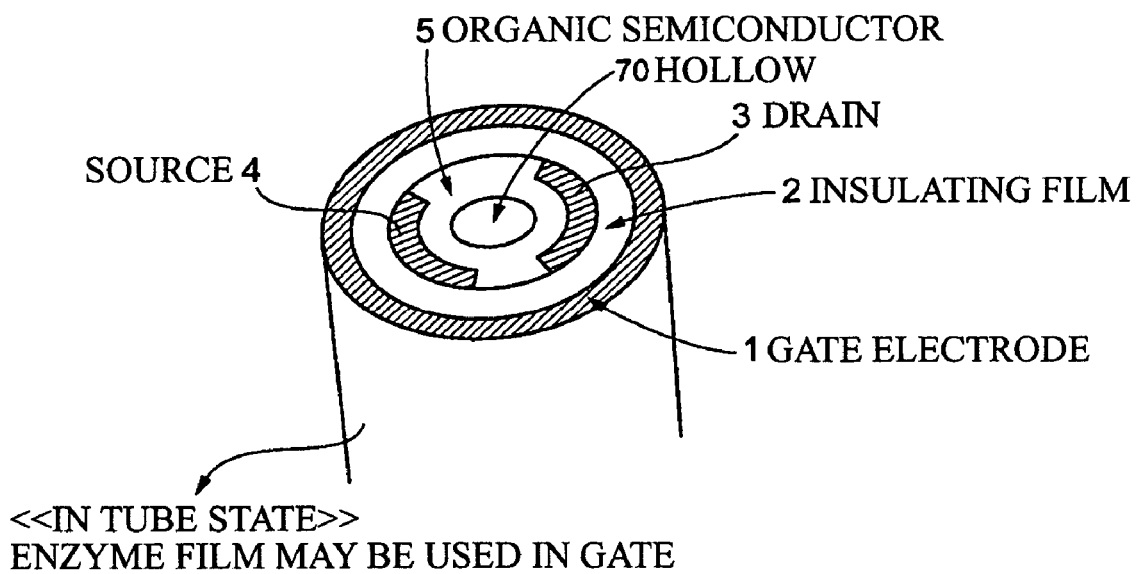
FIG. 9 is a perspective view showing a linear element according to a linear element example.
Figure 9:
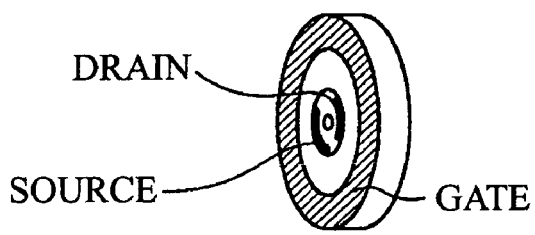

A linear element according to a linear element example 7 is shown in FIG. 9.

A linear element of the present example has a hollow region or an insulating region 70 in the center, and has a semiconductor region 5 on its outside, and has a source region 4 and a drain region 3 inside the semiconductor region 5 so that a portion is outwardly exposed, and has a gate insulating film region 2 and a gate electrode region 1 on its outside.

And, a protective layer made of insulating resin etc. may be disposed on the outside of the gate electrode region 1. A proper position of the protective layer may be opened to form a takeout portion of the gate electrode.

And, also in the present example, a cross section having another shape may be inserted between the cross sections shown in FIG. 7 in any position of a longitudinal direction in a manner similar to the linear element example 2.

In the case of the linear element of the present example, preferably, after the hollow region 70 and the semiconductor region 5 are formed by extrusion, doping is performed to the source region 4 and the drain region 3 and then the insulating film region and the gate electrode region 1 are respectively formed by coating. It is preferable to use inorganic materials such as $SiO_2$ as the insulating film 2.

Linear Element Example 8

Figure 10:
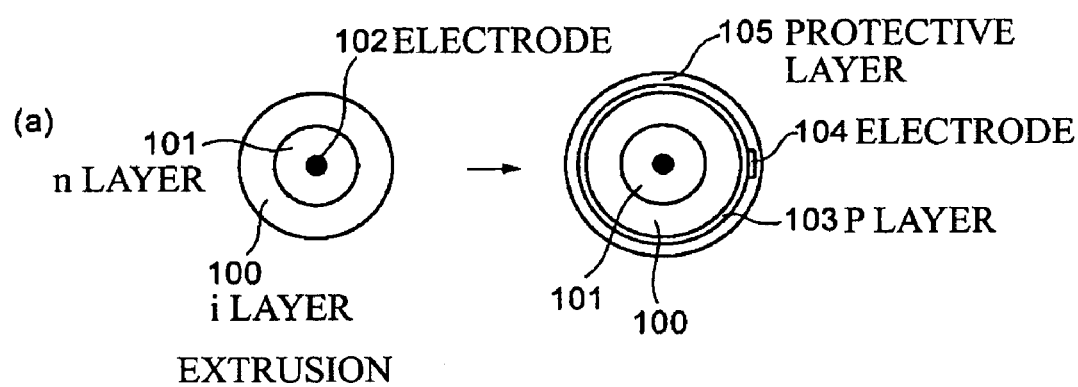
FIG. 10 is a sectional view showing a linear element according to a linear element example.
Figure 10:
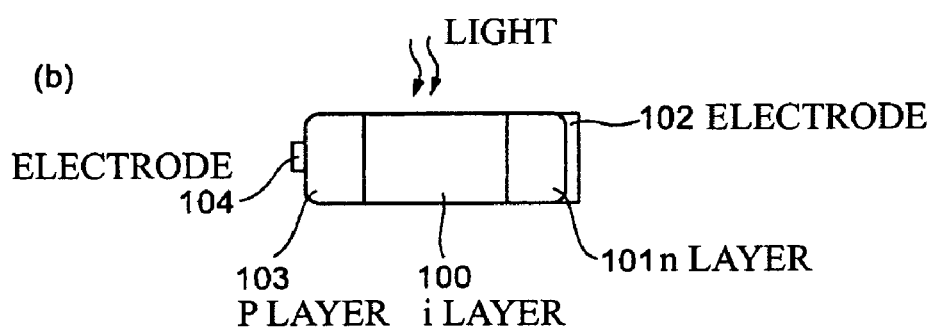

A linear element according to a linear element example 8 is shown in FIG. 10(a).

The present example is a linear element having a pin structure.

That is, an electrode region 102 is had in the center and on its outside, an n layer region 101, an i layer region 100, a p layer region 103 and an electrode region 104 are formed. And, in the present example, a protective layer region 105 made of transparent resin etc. is disposed on the outside of the p layer region 103.

In this linear element, the electrode region 102, the n layer region 101 and the i layer region 100 are integrally formed by extrusion.

The p layer region 103 and the electrode region 104 are formed by post processing. They are formed by, for example, coating. A thickness of the p layer region 103 can be thinned by forming the p layer region 103 by the post processing. As a result of that, in the case of being used as a photovoltaic element, incident light from the p layer 103 can efficiently be captured in a depletion layer.

Of course, the electrode region 102, the n layer region 101, the i layer region 100, the p layer region 103 and the electrode region 104 may be integrally formed by extrusion.

And, in FIG. 10(a), a circumference shape of the i layer is formed into a circle, but is preferably formed into a star shape. As a result of this, an area of junction between the p layer 103 and the i layer 100 increases and conversion efficiency can be enhanced.

In the example shown in FIG. 10(a), the electrode 104 is disposed in a portion of the p layer 103, but may be formed so as to cover all the circumference of the p layer 103.

And, in the case of an np structure, a $p^+$ layer may be disposed between the p layer 103 and the electrode 104. Ohmic contact between the p layer 103 and the electrode 104 becomes easy to make by disposing the $p^+$ layer. Also, electrons tend to flow to the i layer side.

An organic semiconductor material is preferably used as a semiconductor material for forming the p layer, the n layer and the i layer. For example, polythiophene, polypyrrole, etc. are used. Proper doping could be performed in order to for a p type and an n type. It may be a combination of p-type polypyrrole/n-type polythiophene.

Also, it is preferable to use a conductive polymer as an electrode material.

Linear Element Example 9

A linear element according to a linear element example 9 is shown in FIG. 10(b).

In the linear element example 5, the pin structure has been formed concentrically, but in the present example, a cross section shape was a quadrilateral. A p layer region 83, an i layer region 80 and an n layer region 81 were laterally arranged. Also, electrodes 82, 83 were respectively formed on the sides.

In the present example, the cross section shown in FIG. 10(b) is formed continuously in a longitudinal direction.

The linear element of this structure could be integrally formed by extrusion processing.

Linear Element Example 10

In the present example, an electrode region is had in the center and on its outer circumference, one region made of a material in which a p-type material and an n-type material are mixed is formed. Further, an electrode region is formed on its outer circumference.

That is, in the above example, a diode element of a two-layer structure in which the p layer and the n layer are joined (or a three-layer structure through the i layer) has been shown. However, the present example is an example of a one-layer structure made of a material in which a p-type material and an n-type material are mixed.

A p-type/n-type mixed material is obtained by mixing an electron donor conductive polymer and an electron acceptor conductive polymer.

When an element region is formed by the p-type/n-type mixed material, a simple structure is obtained and it is preferable.

Linear Element Example 11

In the present example, the linear element shown in the linear element examples was further drawn in a longitudinal direction. In a drawing method, for example, a technique for drawing a copper wire or a copper tube could be used.

A diameter can be further thinned by drawing. Particularly, in the case of using a conductive polymer, the molecular chains can be paralleled in the longitudinal directions as described above. As well, the spacing between the mutual molecular chains paralleled can be decreased. Therefore, hopping of electrons is efficiently performed. As a result of that, a linear element with better characteristics can be obtained.

It is preferable that a reduction ratio by drawing be 10% or more. It is more preferable that the ratio be 10 to 99%.

And, the reduction ratio is 100 multiplied by (area before drawing minus area after drawing) divided by (area before drawing).

The drawing may be repeated plural times. In the case of a material in which a modulus of elasticity is not large, the drawing could be repeated.

It is preferable that an outside diameter of a linear element after drawing be 1 mm or smaller. It is more preferable that the diameter be 10 μm or smaller. It is still more preferable that the diameter be 1 μm or smaller. It is most preferable that the diameter be 0.1 μm or smaller.

Linear Element Example 12

Figure 11:
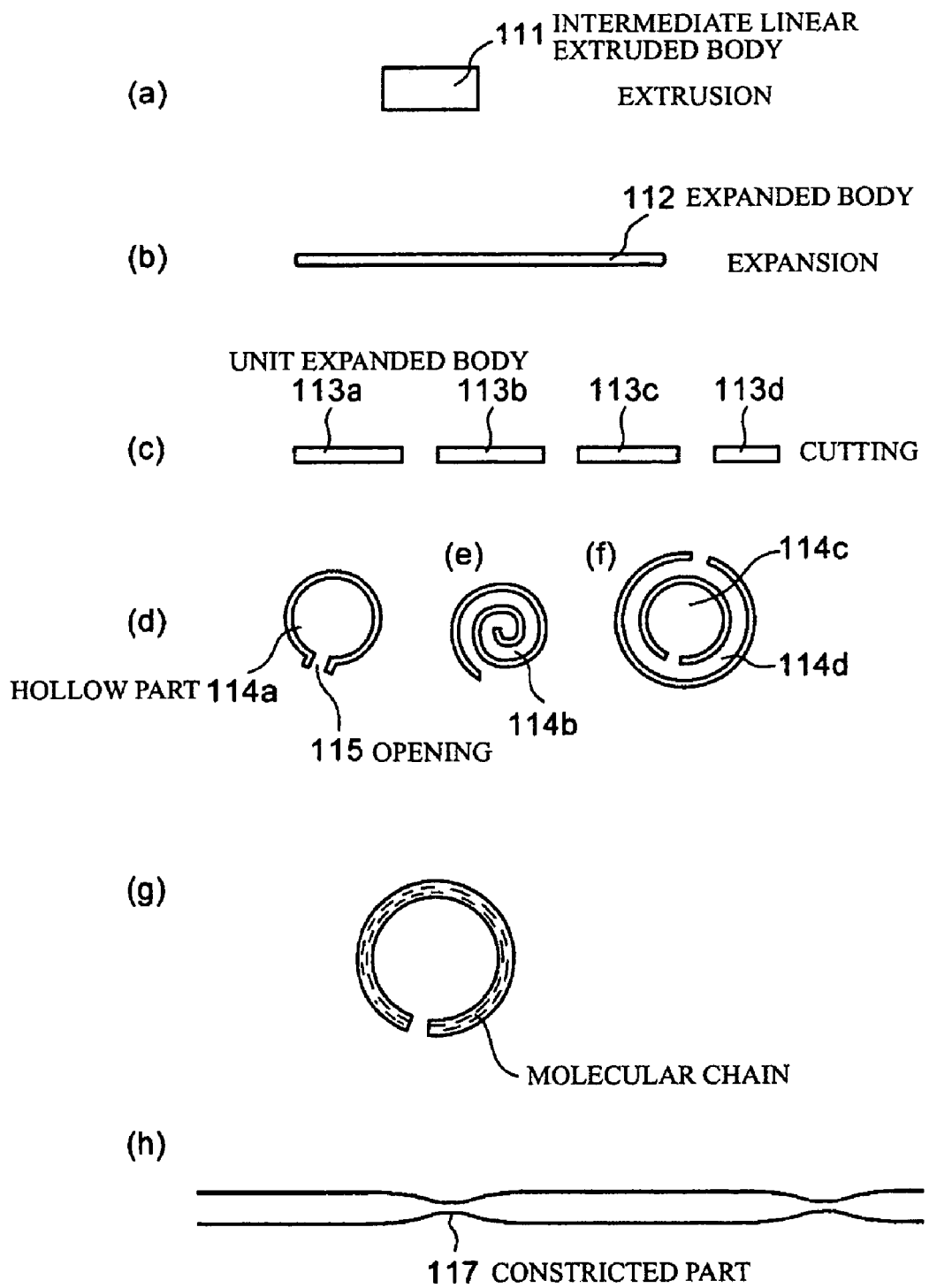
FIG. 11 is a process diagram showing a production example of a linear element.

A linear element example 12 is shown in FIG. 11.

In the present example, a raw material is linearly formed in a quadrilateral shape of a cross section by extrusion and an intermediate linear extruded body 11 is produced (FIG. 11(a)). The raw material may be extruded in other shapes of the cross section.

Next, the intermediate linear extruded body 111 is expanded in a lengthwise direction or a lateral direction in the cross section and an expanded body 112 is formed (FIG. 11(b)). The example of being expanded in the lateral direction in the drawing is shown in FIG. 11.

Then, the expanded body 112 is cut into a proper number parallel in a longitudinal direction and plural unit expanded bodies 113a, 113b, 113c, 1113d are produced. And, it may proceed to the next process without performing this cutting.

Then, the unit expanded body is processed in a proper shape. In the example shown in the drawing, it is processed in a ring shape (FIG. 11(d)), a spiral shape (FIG. 11(e)) and a double ring shape (FIG. 11(f)).

Then, a proper material is buried in hollow parts 114a, 114b, 114c, 114d. When the unit expanded body is a semiconductor material, an electrode material is buried. Of course, it may be buried concurrently with processing into the ring shape rather than buried after processing into the ring shape etc.

Also, in the case of the double structure as shown in FIG. 11(f), the unit expanded body 114c may use a material different from that of the unit expanded body 114d.

Also, after extrusion (FIG. 11(a)), expansion (FIG. 11(b)) or cutting (FIG. 11(d)), the surface may be coated with another material. The coating could be performed by, for example, dipping, vapor deposition, plating and other methods. A coating material can be selected properly according to a function of an element produced. The coating material may be any of semiconductor materials, magnetic materials, conductive materials and insulating materials. The coating material may be any of inorganic materials and organic materials.

In the case of using a conductive polymer as an expanded body material in the present example, longitudinal directions of molecular chains are oriented so as to be positioned in a right and left direction on the drawing, which is an expansion direction. As a result of that, after being processed in the ring shape, the longitudinal directions of the molecular chains are oriented in a circumferential direction as shown in FIG. 11(g). Therefore, electrons tend to hop in a radial direction.

Also, when an opening 115 is disposed in the case of being processed in the ring shape, this opening can be used as, for example, a takeout opening of an electrode etc. It can also be used as a connection part between mutual linear elements in the case of weaving the linear elements mutually and forming an integrated device. Also, it can be used as a junction surface to another region.

And, after processing of the ring shape etc., a linear body having this ring shape etc. can be used as an intermediate body for completing a linear element having a desired cross-sectional region.

And, as shown in FIG. 11(h), a constricted part (a part different from other parts in a cross-sectional outside diameter shape) 117 may be disposed periodically or aperiodically in a proper position of a longitudinal direction of a linear body. In the case of weaving another linear element perpendicularly in the longitudinal direction, this constricted part can be utilized as a mark of positioning. Formation of such a constricted part is not limited to the present example, and can also be applied to other linear elements.

And, it is preferable that the degree of orientation of the molecular chains in the circumferential direction be set at 50% or higher. It is more preferable that the degree be set at 70% or higher. As a result of this, a linear element with good characteristics can be obtained.

Linear Element Example 13

Figure 12:
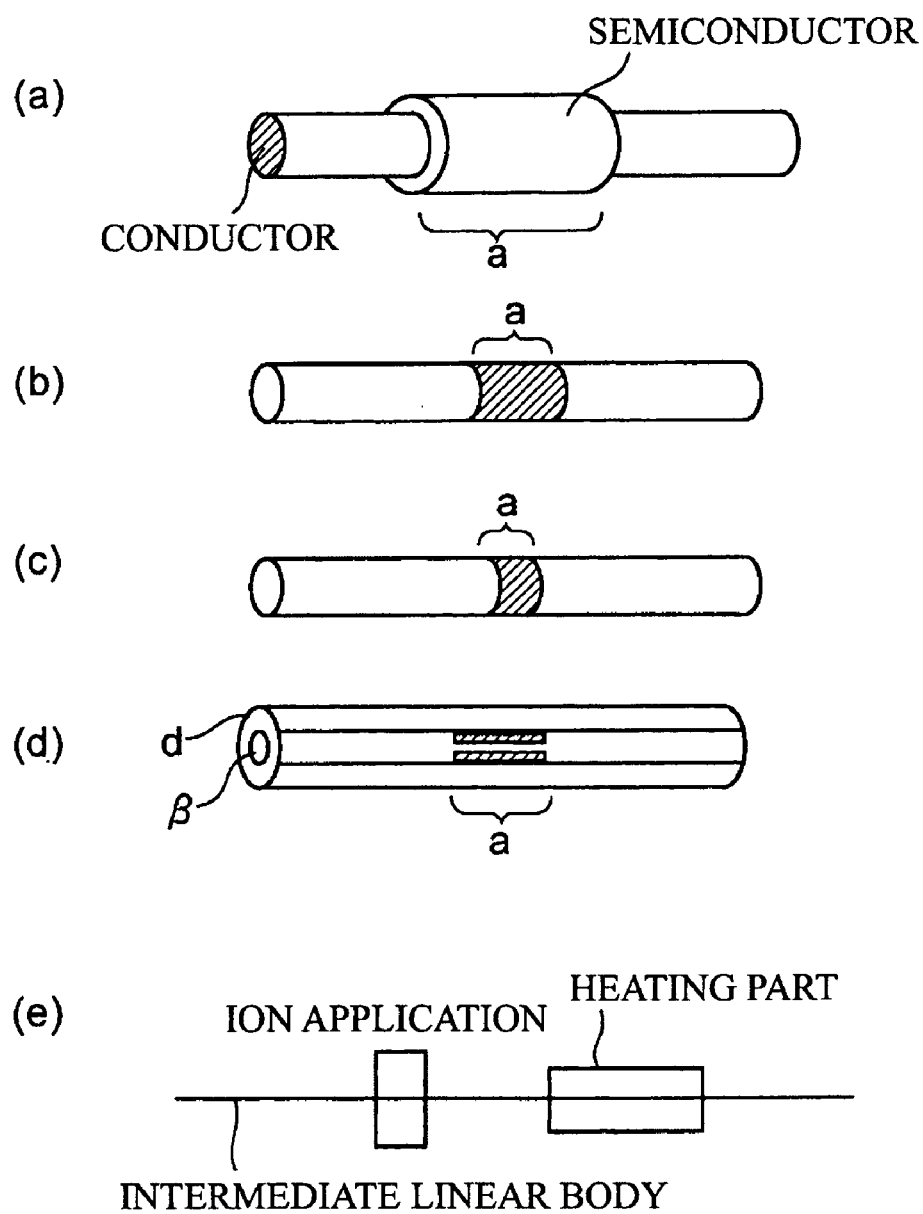
FIG. 12 is a perspective view showing a production example of a linear element.

The producing method example of an element in which a cross-sectional shape is intermittently formed has been described in the above linear element examples, but in the present example, another producing example in the case of extrusion formation is shown in FIG. 12.

And, only a portion of a region in which a circuit element is formed is shown in FIG. 12.

In FIG. 12(a), a semiconductor material is ejected at only timing shown by a in the case of ejecting the semiconductor material. A conductor and a semiconductor may be simultaneously formed by continuously ejecting a conductor material and intermittently ejecting the semiconductor material. Also, a semiconductor material may be intermittently ejected on the circumference of a conductor while a conductor part is first formed and the conductor is traveled.

In an example shown in FIG. 12(b), a linear semiconductor or insulator is first formed and then a portion having a different cross-sectional region in a longitudinal direction is disposed by coating a conductive body intermittently in the longitudinal direction through vapor deposition etc.

In an example shown in FIG. 12(c), first, an organic material is linearly formed. Next, light is intermittently applied in a longitudinal direction and photopolymerization is caused in the applied portion.

As a result of this, a portion having a different cross-sectional region in the longitudinal direction can be formed.

In FIG. 12(d), α is a conductive polymer of a light transmission type and β is an intermediate linear body in which two layers made of a conductive polymer of a photo-curing type are integrally formed by extrusion. When light is intermittently applied while traveling this intermediate linear body, an a portion causes photo-curing. As a result of this, a portion having a different cross-sectional region in a longitudinal direction can be formed.

FIG. 12(e) is an example of using ion application. A linear body is traveled and an application device is disposed on the way. Ions are intermittently applied from ion application. The ions may be applied from all the directions or may be applied from only a predetermined direction. The direction could be decided properly according to a cross-sectional region to be formed. Also, a range of the ion could be decided properly.

A heating device is disposed in the downstream side of an ion application device, and the linear body after the ion application is heated. A portion to which the ions are applied is changed into the different composition by heating.

In the case of being applied from all the directions, all the surfaces are changed into the different composition. Also, in the case of applying the ions from only a predetermined direction, only the portion is changed into the different composition.

And, with respect to the portion to which the ions are applied, the example in which an intermediate linear body of a subject of the ion application has a one-layer structure has been shown in the example shown in FIG. 12(f), but even for a two-layer structure, the ions can also be implanted in only the inside by controlling a range at the time of the ion application. A different composition can be formed in the inside applied by heat treatment.

When a silicon linear body is used as an intermediate linear body and O ions are implanted, an $SiO_2$ region can be formed. In the case of controlling a range, the so-called BOX (buried oxide film) can be formed. And, the BOX has been described as the case of intermittently forming another cross-sectional region, but the BOX may be formed in the whole area of a longitudinal direction.

Application Example 1

The present example is an example of forming an integrated circuit by weaving of plural linear elements.

Figure 13:
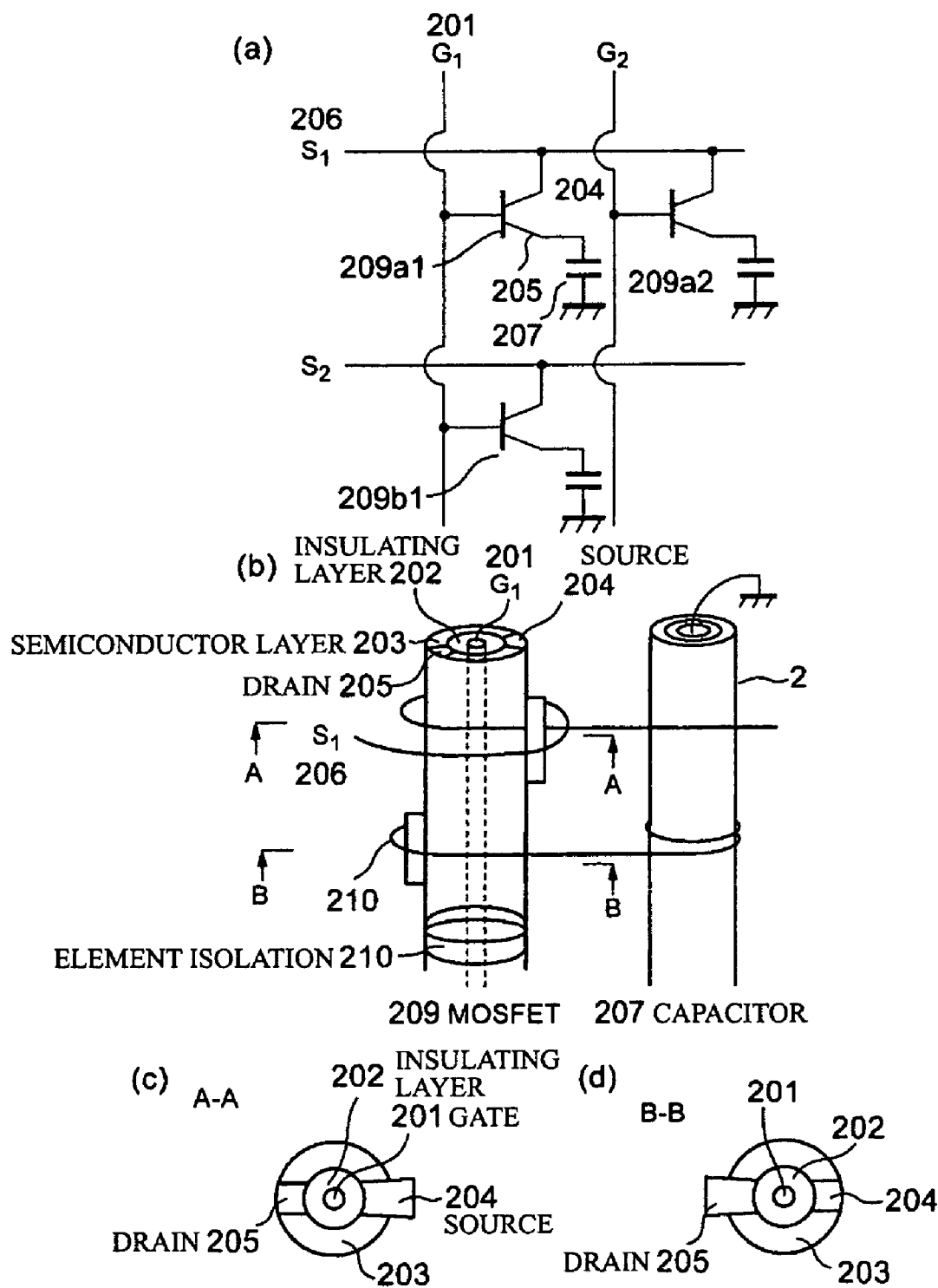
FIG. 13 is a diagram showing an example applied to an integrated circuit apparatus.

An integrated circuit example is shown in FIG. 13.

An integrated circuit shown in FIG. 13 is a DRAM type semiconductor memory. The DRAM memory is made of memory cells arranged vertically and horizontally and its circuit is shown in FIG. 13(a).

One cell is made of a MOSFET 209a1 and a capacitor 207. Conductors of bit lines S1, S2, . . . and word lines G1, G2, . . . are connected to each of the cells.

As shown in FIG. 13(b), this cell is constructed of a MOSFET linear element 209a1 and a capacitor linear element 207. The MOSFET linear elements are prepared by the number of columns.

In this MOSFET 209a1, a gate electrode 201, an insulating layer 202, source and drain 204 and 205, and a semiconductor layer 203 are sequentially formed from the center toward the outer circumference.

Also, an element isolation region 210 is formed in a longitudinal direction. However, the gate electrode 201 extends through one linear body. That is, using one gate electrode as a common word line, plural MOSFETs 209a1, 209b1, . . . are formed in one linear body in the longitudinal direction.

Also, MOSFETs 209a2, a3, . . . of FIG. 13(a) are similarly constructed of linear elements.

And, it is preferable to construct this MOSFET linear element of a polymer material.

Also, a takeout part of the source region 204 is protruded radially as shown in FIG. 13(c). This is because contact with the bit line S1 is facilitated. Also, the drain region 205 is protruded radially as shown in FIG. 13(d). The protrusion positions of the drain and the source are shifted in the longitudinal direction.

On the other hand, in the capacitor linear element 207, an electrode, an insulating layer and an electrode are sequentially formed from the center toward the outside.

S1 is the bit line and has a linear shape. It is preferable to use a conductive polymer as a material. This bit line S1206 is wound on the source part 204 to make contact with the source 204. This bit line S1 is wound on source regions of linear MOSFET elements respectively constructing the MOSFETs 209a2, a3, . . . .

Also, the drain region 205 is connected to the capacitor 207 by a linear conductive polymer 210.

And, in the example shown in FIG. 13, the capacitor has been formed by another linear element, but may be disposed in a proper position of a linear body in which the MOSFET is formed. As a result of that, the number of linear elements used decreases and the degree of integration can be increased more. Also, the capacitor is not connected by the conductive polymer 210 and may be directly joined to the MOSFET linear element using a conductive adhesive etc.

As described above, after weaving the linear elements vertically and horizontally, all the linear elements could be coated with an insulating material to prevent leakage of a conductive part.

And, a diode may be used instead of the capacitor.

Application Example 2

The present example shows an integrated circuit formed by bundling plural linear elements.

An example of using a MOSFET linear element is also shown in the present example. Of course, other linear elements may be used.

Plural MOSFET linear elements are prepared.

When signal input elements are formed on end faces of each of the linear elements and are bundled, various information can be sensed. For example, when a light sensor, an ion sensor, a pressure sensor, etc. are disposed, information corresponding to five senses of human beings can be sensed.

For example, when a sensor corresponding to signals of 100 kinds attempts to be formed of a conventional substrate type semiconductor integrated circuit, the sensor must be produced by repeating photolithography processes 100 times. However, in the case of using an end face of the linear element, the sensor corresponding to the signals of 100 kinds can be formed simply without repeating such photolithography processes.

Also, a sensor with high density can be obtained.

Application Example 3

It can be applied as, for example, a photovoltaic integrated device as described below.

A photovoltaic device can be formed by bundling, twisting or weaving linear elements having pin structures. And, it is preferable that a pin layer be constructed of a conductive polymer. Also, it is preferable to add a sensitizer.

For example, fabric is formed by weaving linear elements and clothes can also be formed by this fabric. In this case, all the linear elements form a light receiving region and incident light can be received from an angle of 360°. As well, light can be received in a three-dimensional manner and a photovoltaic element with high light receiving efficiency can be formed.

Also, light capture efficiency is very high. That is, the light, which is not inputted to the linear element and is reflected, is also captured in fabric and repeats reflection and thereby is inputted to the other linear elements. And, it is preferable to form the linear elements by extrusion processing.

Electrodes from each of the elements could be connected to a collecting electrode to dispose a connection terminal in this collecting electrode.

Also, when a storage battery is incorporated into back fabric of clothes, electricity can be utilized in a dark place.

Also, when a heat generation body is disposed in clothes, the clothes having a heating effect can be formed.

Further, when linear heat generation body are coated with an insulating layer and are woven in fabric shape together with linear photovoltaic elements, clothes having a heating effect can be produced.

Also, linear elements can be transplanted to a base material of a desired shape to form a solar battery. That is, a solar battery with extremely high light capture efficiency can be formed by transplanting the linear elements in a fuzzy state or a hedgehog-like state.

Reduction in the total weight is desired in a communication satellite. Since the solar battery is very lightweight, the solar battery is useful as a power generator in the communication satellite.

Since the solar battery has bendability, the solar battery can be formed along any shape and can be attached to an outer surface of a main body of the communication satellite using an adhesive.

And, when linear photovoltaic elements are easily transplanted to the surface of a base material adapted for a shape of a person's head, an artificial wig having a power generation function can be formed.

Also, in the case of using very thin linear elements, the linear elements have a suede effect and can be used as a leather-like surface. A bag can also be formed by such linear elements. That is, a bag having a power generation function can be formed.

Application Example 4

Figure 14:
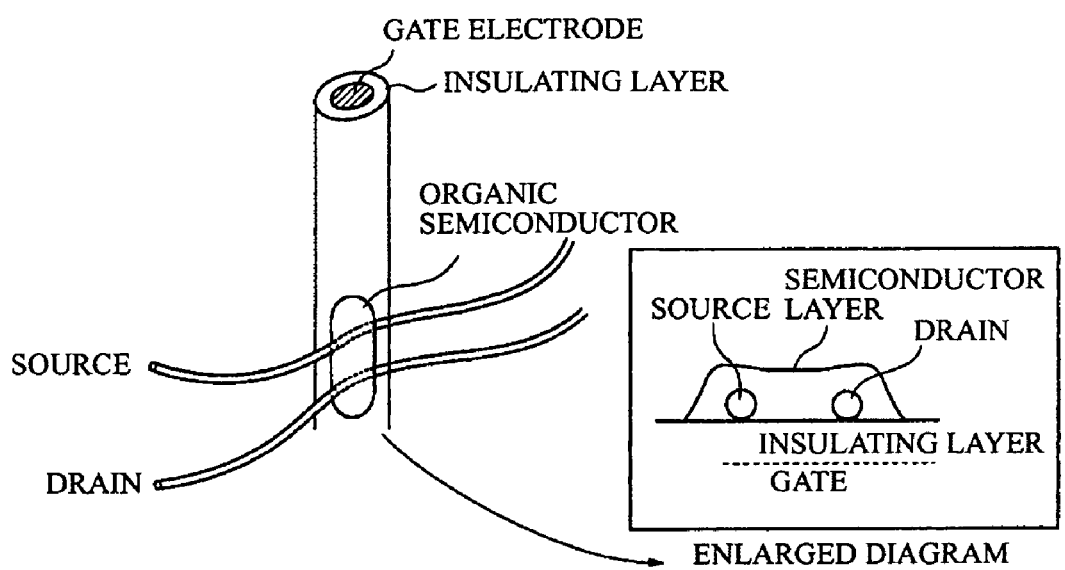
FIG. 14 is a diagram showing an example applied to an integrated circuit apparatus.

Another application example is shown in FIG. 14.

In the present example, a linear source electrode and a linear drain electrode are brought into contact with a proper position of a linear body in which a gate electrode is coated with an insulating layer. The range of a contact portion of the source electrode to a contact portion of the drain electrode is coated with an organic semiconductor material.

Figure 15:
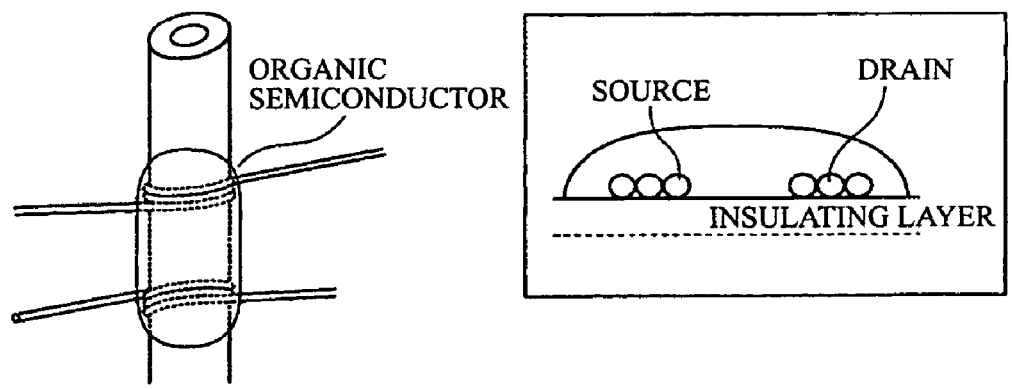
FIG. 15 is a diagram showing an example applied to an integrated circuit apparatus.

Also, as shown in FIG. 15, a linear source electrode or a linear drain electrode may be once or plural times wound on a linear body in which a gate electrode is coated with an insulating layer. Sufficient contact can be obtained by winding. And, when a constricted portion is disposed in the linear body, it is convenient for positioning in the case of winding etc.

Figure 16:
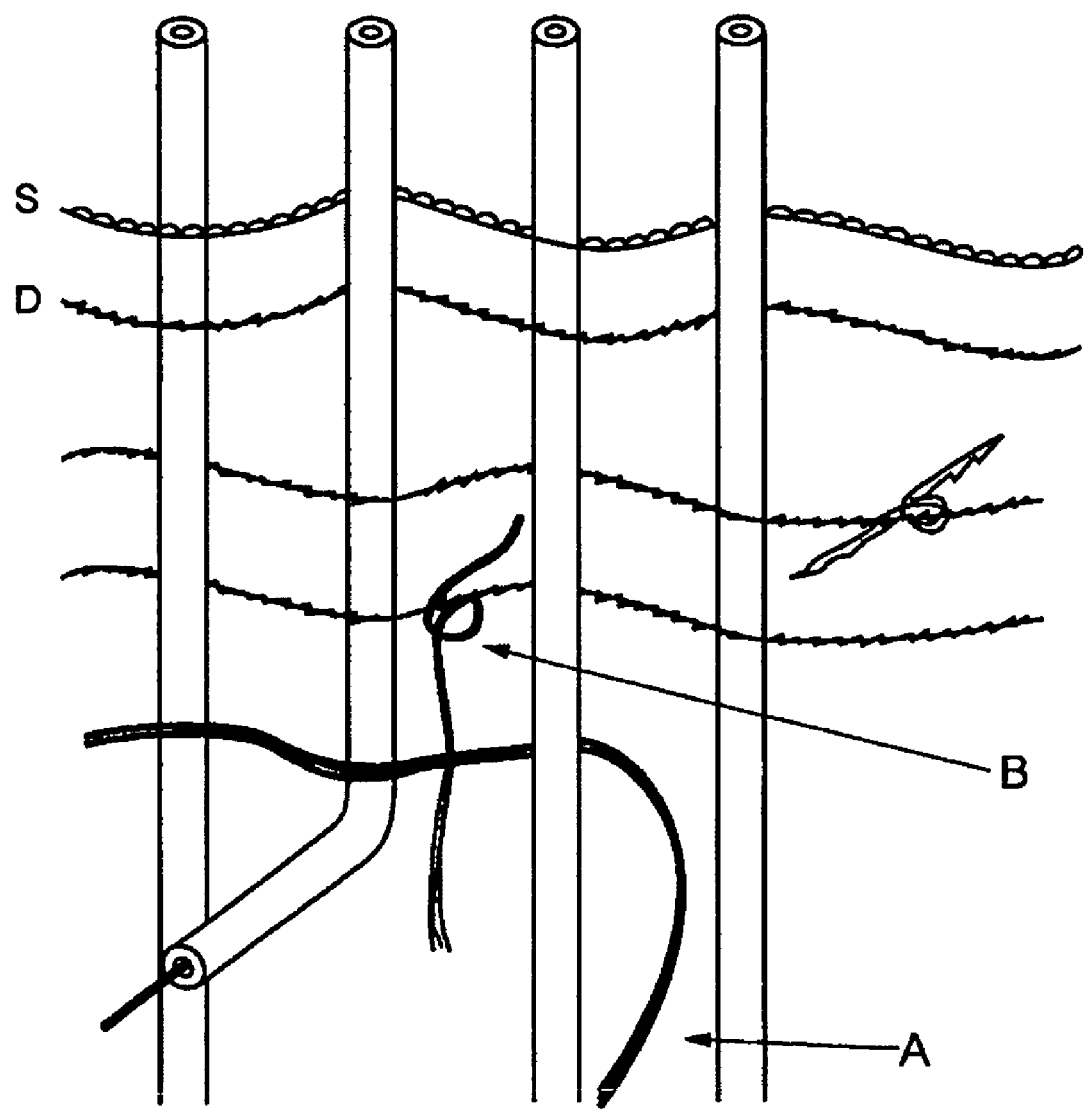
FIG. 16 is a diagram showing an example applied to an integrated circuit apparatus.

As shown in FIG. 16, a source electrode and a drain electrode can also be brought into contact with only a proper linear body (point A). Also, connection between the source electrode and the drain electrode can further be made by another conductor (point B).

In FIG. 16, an example of one column as a column has been shown, but can also be arranged in plural columns. In this case, connection could be made in a three-dimensional manner. Since the linear body, the source electrode and the drain electrode have bendability, they can be bent in a desired direction in a desired position.

When mutual connections are made in a desired position in a three-dimensional manner using, for example, MOSFET linear elements as a linear body, a desired logic circuit can be assembled. In the case of using a conventional semiconductor substrate as a basic component, a long current passage is required, but use of linear elements enables the current passage to be shortened extremely and a very high-speed logic circuit can be constructed.

Linear Element Example 14

Figure 17:
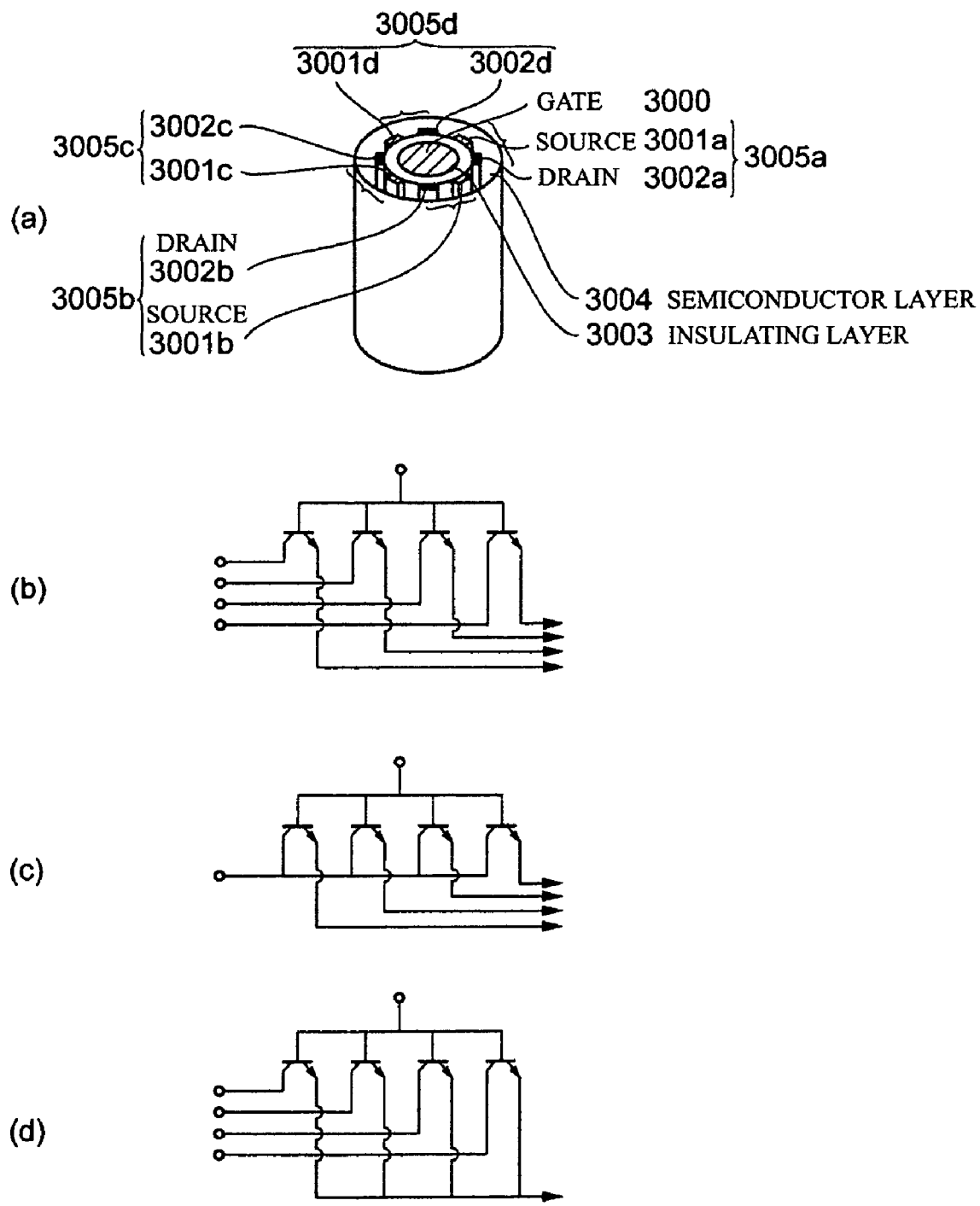
FIG. 17 is a view showing a linear element example 14.

A linear element example 14 is shown in FIG. 17.

As shown in FIG. 17($a$), in a linear element of the present example, a center electrode 3000 is had in the center, and an insulating layer 3004 is formed on the outer circumference of said center electrode 3000, and a semiconductor layer 3003 in which pairs of source regions 3001$a$, 3001$b$, 3001$c$, 3001$d$ and drain regions 3002$a$, 3002$b$, 3002$c$, 3002$d$ are formed by plural pairs 3005$a$, 3005$b$, 3005$c$, 3005$d$ is formed on the outer circumference of said insulating layer 3004.

An equivalent circuit of the linear element shown in FIG. 17($a$) is shown in FIG. 17($b$).

In the present example, the center electrode 3000 acts as a gate electrode. Also, the center electrode 3000 acts as a common electrode. That is, the center electrode acts as the common electrode of four source and drain pairs 3005$a$, 3005$b$, 3005$c$, 3005$d$. Four pairs of MOSFETs can be produced in one linear body by having only one gate electrode. Of course, the source and drain pairs are not limited to four pairs, and two or more pairs may be formed.

FIG. 17($c$) is an equivalent circuit of the case of connecting sources by a common line. The sources could be connected in an end face of the top or the bottom of a linear body. Also, an exposure part may be formed in the middle portion of a longitudinal direction of the linear body to make connection from the exposure part.

FIG. 17($d$) is an equivalent circuit of the case of connecting drains by a common line. Connection between the drains could be made in a manner similar to the case of the sources.

The element of the present example can be produced by, for example, the injection molding described above.

Linear Element Example 15

Figure 18:
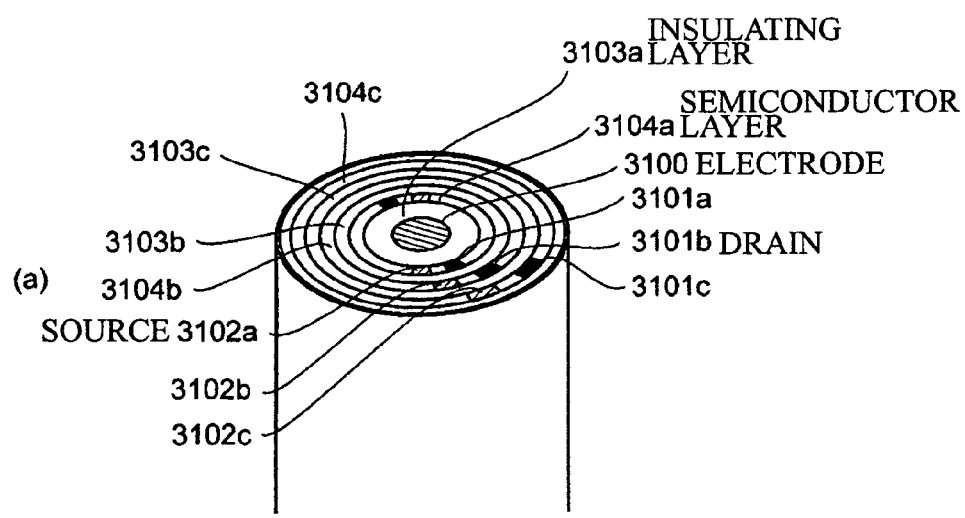
FIG. 18 is a view showing a linear element example 15.
Figure 18:
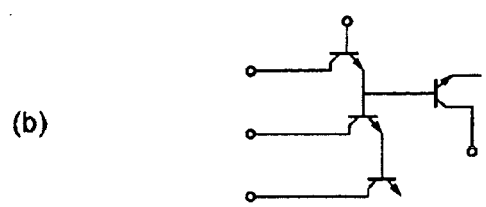
Figure 18:
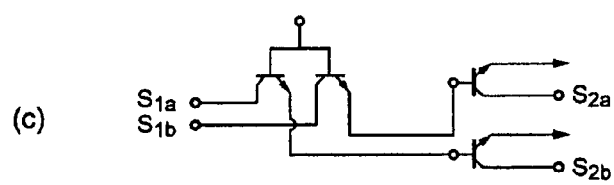

A linear element example 15 is shown in FIG. 18.

As shown in FIG. 18($a$), a linear element of the present example is constructed so that an electrode 3100 is had in the center and an insulating layer 3103$a$ is formed on the outer circumference of said center electrode 3100 and plural semiconductor layers 3104$b$, 3104$c$ and insulating layers 3103$b$, 3103$c$ are alternately formed on the outer circumference of said insulating layer 3103$a$ and one or more pairs of a source region 3102$b$ and a drain region 3101$b$ are formed in each of the semiconductor layers of the outside from the second layer and also a drain region 310$a$ or a drain electrode in the semiconductor layer of the inside is located between said source region 3102$b$ and the drain region 3101$b$.

An equivalent circuit of the element of FIG. 17($a$) is shown in FIG. 18($b$).

In the present example, an output of the drain in the inside circumference is used as an input of the semiconductor layer in the outside circumference. Therefore, parallel processing of many signals can be performed by one gate (center electrode 3100).

FIG. 18($c$) is an equivalent circuit of the case of forming plural MOSFETs in one semiconductor layer. Thus, according to the present example, an integrated circuit with a very high degree of integration can be formed.

Linear Element Example 16

Figure 19:
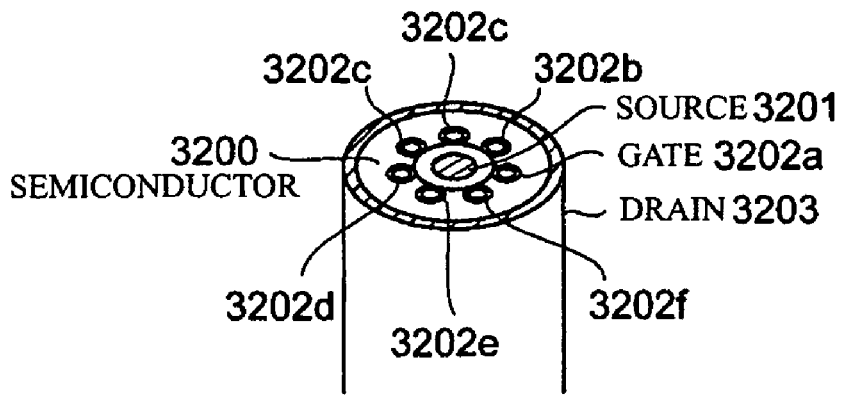
FIG. 19 is a view showing a linear element example 16.
Figure 19:
Figure 19:
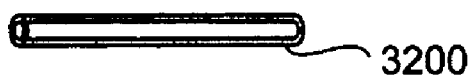
Figure 19:
Figure 19:

A linear element example 16 is shown in FIG. 19.

The present example has a source region 3201 in the center of a semiconductor layer 3200, and has plural gate electrodes 3202$a$, 3202$b$, 3202$c$, 3202$d$, 3202$e$, 3202$f$ intermittently arranged in a circumferential direction on the circumference of said source region 3201 through a semiconductor layer, and has a drain region 3203 on the outer circumference of said semiconductor layer 3200.

An example of producing the element of the present example is shown in (1) to (5) of FIG. 19.

First, a wire 3201 for source is prepared. For example, silver, gold and other conductive materials could be used as the wire for source.

Next, a surface of the wire 3201 for source is coated with a semiconductor layer by a dipping method etc. It is preferable to use the organic semiconductor described above as a semiconductor.

On the other hand, plural gate electrodes are prepared and the gate electrodes are placed on a flat surface at a desired spacing.

After being coated with the semiconductor layer, it is rolled on the gate electrodes at a point in time when the semiconductor layer is in a semidry state as shown in (3). As a result of this, an intermediate body in which the gate electrodes are circumferentially placed on a surface of the semiconductor layer at the desired spacing is formed.

Then, a semiconductor liquid layer is formed on a surface of the intermediate body in which the gate electrodes are formed by a dipping method etc.

Then, a drain electrode made of gold etc. is formed on the outer circumference of the semiconductor layer by a vapor deposition method etc.

Linear Element Example 17

Heat treatment is performed with respect to a linear element for various purposes. Also, dopant is injected into the linear element.

Figure 20:
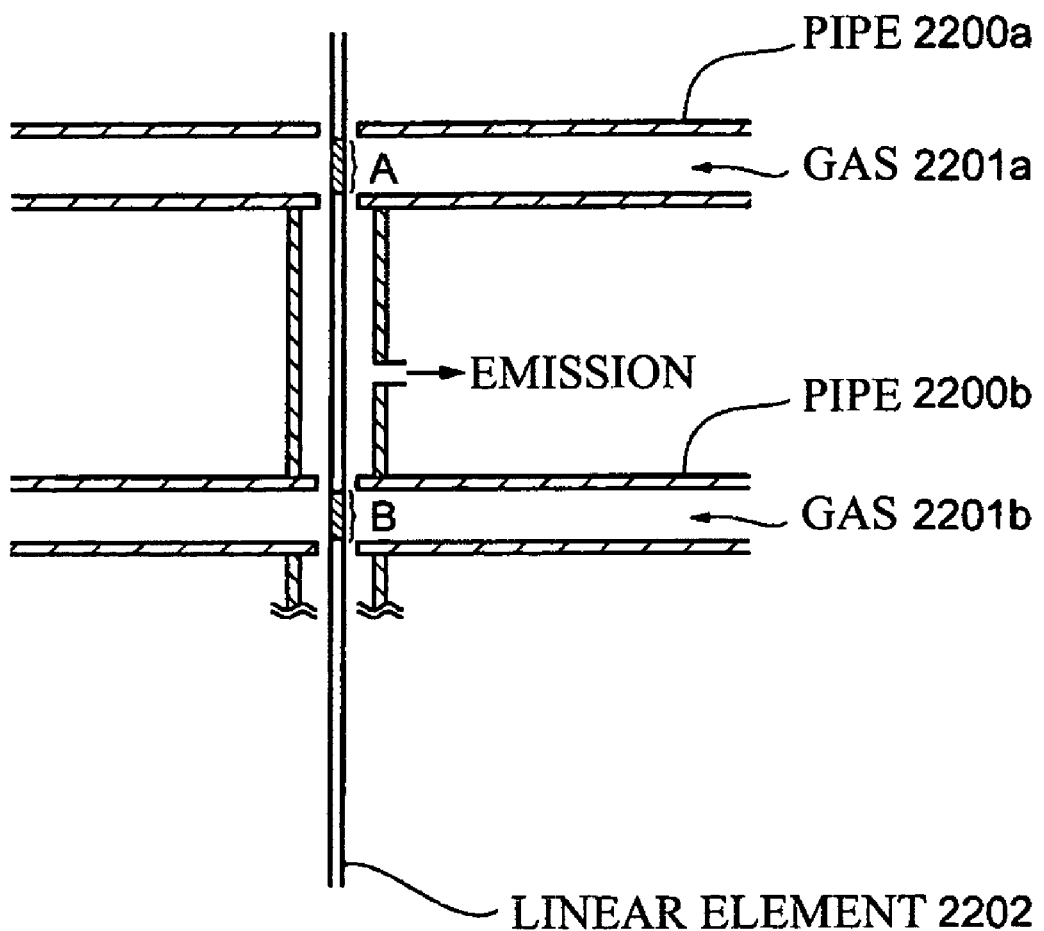
FIG. 20 is a view showing a linear element example 17.

FIG. 20 is a diagram showing an apparatus capable of performing heat treatment at different temperatures or injecting different dopants.

The present apparatus is constructed so that plural pipes 2200*a*, 2200*b* are placed in a multistage state and a linear element 2202 is fed through the pipes 2200*a*, 2200*b* placed in the multistage state.

For example, when an oxide film wants to be formed in an A portion of the linear element 2202, feeding of the linear element 2202 could be stopped to introduce warmed oxidative gas into the pipe 2200*a*. Or, when gas including dopant is introduced, the dopant can be injected into the A portion. Therefore, a linear element having a different cross-sectional region in a longitudinal direction can be produced.

Also, when heat treatment of the whole linear element 2202 wants to be performed, warmed inert gas could be introduced into the pipe 2200*a* with feeding of the linear element continued. For example, it can be used in heat treatment for diffusing dopant after the dopant is injected.

Also, the same gas or different gases may be supplied to the pipe 2200*a* and the pipe 2200*b*. When the same gas is supplied, gas temperature may be set at different temperatures or may be set at the same temperature.

And, it is preferably constructed so that a gap between the pipe 2200*a* and the pipe 2200*b* is held in a sealed state and emission is performed from sealed space. As a result of this, leak gas can be prevented from leaking to the outside.

As the gas, for example, diborane gas may be supplied. In this case, the linear element passes through a liquid phase, so that, for example, doping can be performed. That is, the doping can be performed even in the case of the simple apparatus as shown in FIG. 20.

And, in the heat treatment with respect to the linear element, heat treatment intended to obtain the optimum junction or crystallinity, heat treatment intended for diffusion of dopant and other heat treatment are illustrated.

INDUSTRIAL APPLICABILITY (Effect of Linear Element)

A linear element which has flexibility or bendability without being limited to its shape and can generate various apparatus with any shapes, and a method of producing the linear element can be provided.

An end face sensor device which has flexibility or bendability without being limited to its shape and can generate various apparatus with any shapes, and a method of producing the end face sensor device can be provided.

The invention claimed is:

1. An end face sensor device, comprising:
 a linear body (2001), the linear body having a conductive polymer center electrode (2007) with an outer circumference of the center electrode coated with an insulating film made of polymer (2008) the linear body being flexible along a length of the linear body; and
 a receiving part for receiving information from a subject and outputting the information as another information formed on an end face of the linear body, the receiving part being a light sensor coated with a transparent electrode (2006) extending along the length of the linear body, the transparent electrode defining a final exterior surface of the length of the linear body exposed to the atmosphere.

2. An end face sensor device as claimed in claim 1, wherein the light sensor comprises an active portion made of a conductive polymer.

3. An end face sensor device as claimed in claim 1, wherein, the light sensor is any of a photodiode, a phototransistor, a photo IC, a photo thyristor, a photoconductive element, a pyroelectric element, a color sensor, a solid-state image sensor, an element for position detection, and a solar battery.

4. An end face sensor device as in claim 3, characterized in that a part or all of the receiving part is formed of a polymer.

5. An end face sensor device as in claim 3, characterized in that the linear body is a linear element in which a circuit element is formed continuously or intermittently in a longitudinal direction.

6. An end face sensor device as in claim 3, characterized by being a linear element in which a cross section having plural regions for forming a circuit is formed continuously or intermittently in a longitudinal direction.

7. An end face sensor device, comprising:
 a linear body (2001), the linear body having a conductive polymer center electrode (2007) with an outer circumference of the center electrode coated with an insulating film made of polymer (2008); and
 a receiving part for receiving information from a subject and outputting the information as another information formed on an end face of the linear body, wherein, the receiving part is a light sensor comprising an n-type semiconductor layer (2004) formed on the end face of the linear body, with a p-type semiconductor layer (2003) formed on the n-type semiconductor layer, the n-type and p-type layers together forming a pn junction of the light sensor receiving part; and
 a transparent electrode (2006) coating the p-type semiconductor layer, the end face of the linear body, and the insulating film, the transparent electrode defining a final exterior surface of a full length of the linear body exposed to the atmosphere.

* * * * *